United States Patent
Buckley et al.

(10) Patent No.: US 11,334,622 B1
(45) Date of Patent: May 17, 2022

(54) APPARATUS AND METHODS FOR LOGGING, ORGANIZING, TRANSCRIBING, AND SUBTITLING AUDIO AND VIDEO CONTENT

(71) Applicants: Raymond James Buckley, Portland, OR (US); Silvia Geboiu, Portland, OR (US)

(72) Inventors: Raymond James Buckley, Portland, OR (US); Silvia Geboiu, Portland, OR (US)

(*) Notice: Subject to any disclaimer, the term of this patent is extended or adjusted under 35 U.S.C. 154(b) by 0 days.

(21) Appl. No.: 17/220,896

(22) Filed: Apr. 1, 2021

Related U.S. Application Data

(60) Provisional application No. 63/003,667, filed on Apr. 1, 2020.

(51) Int. Cl.
| | |
|---|---|
| *H04N 9/80* | (2006.01) |
| *G06F 16/783* | (2019.01) |
| *G06F 16/738* | (2019.01) |
| *G06F 16/78* | (2019.01) |
| *H04N 5/93* | (2006.01) |
| *G11B 27/00* | (2006.01) |

(52) U.S. Cl.
CPC ........ *G06F 16/7844* (2019.01); *G06F 16/739* (2019.01); *G06F 16/7834* (2019.01); *G06F 16/7847* (2019.01); *G06F 16/7867* (2019.01)

(58) Field of Classification Search
USPC ........................................ 386/241, 248, 278
See application file for complete search history.

(56) References Cited

U.S. PATENT DOCUMENTS

| | | | | |
|---|---|---|---|---|
| 11,074,769 B2* | 7/2021 | Balakrishnan | ... | G08B 13/19669 |
| 11,157,681 B2* | 10/2021 | Weald | ................... | G06F 40/186 |
| 11,169,767 B2* | 11/2021 | Bittner | ................ | G11B 27/022 |
| 11,257,044 B2* | 2/2022 | Carver | ................ | G06V 40/172 |
| 2021/0334303 A1* | 10/2021 | Guo | ........................ | G06F 1/163 |
| 2022/0078614 A1* | 3/2022 | Janefalkar | ............. | H04W 12/06 |

* cited by examiner

*Primary Examiner* — Nigar Chowdhury
(74) *Attorney, Agent, or Firm* — J. Curtis Edmondson; Law Offices of J. Curtis Edmondson

(57) ABSTRACT

A software system of some embodiments allows automatic logging, organization, transcription, and/or subtitling/captioning of audio/video content. User selected audio/video content is automatically transcribed. Instances and recurrences of events are automatically identified within transcripts and their corresponding clips. Recurrences of events can be automatically identified based on user identification of instances. Identifications within transcripts/clips can be automatically demarcated and logically or systematically arranged, categorized, classified, labelled, marked, grouped, and/or organized into audio/video sequences by the software system. Categorization, classification, labelling, and/or marking can be applied from transcript data, file names, order of identification occurrence, custom text, and/or analysis of audio and/or video content using AI. Transcripts can be displayed in arrangement and/or amalgamation to match the arrangement of their corresponding clips in an audio/video sequence. Subtitles/captions are automatically generated from transcripts or amalgamated arrangements of transcripts.

48 Claims, 19 Drawing Sheets

200
APPARATUS AND METHODS FOR LOGGING, ORGANIZING, TRANSCRIBING, AND SUBTITLING AUDIO AND VIDEO CONTENT

CROSS REFERENCE TO RELATED APPLICATIONS

This application claims benefit to U.S. Provisional Patent Application 63/003,667, entitled "A software system that automatically logs, organizes, transcribes, and subtitles audio and video content.", filed Apr. 1, 2020.

BACKGROUND

As part of the audio, video, and/or audio/video editing process, a phase (or phases) is often undertaken to (do some or all of, but not limited to, the following:) log, organize, transcribe, and/or subtitle/caption audio, video, and/or audio/video content. Such a phase (or phases) may include logging and/or organizing that includes logical or systematic arrangement, reordering, trimming, categorization, classification, labelling, marking, grouping, and/or filing of audio, video, and/or audio/video content (or portions thereof), as well as the transcription of audio, video, and/or audio/video content and/or the subtitling/captioning of audio, video, and/or audio/video content. The logging and/or organizing may (or may not) consist of "stringing out" audio, video, and/or audio/video content, producing one or more "stringouts" ("stringout" being a common term in the field of audio/video editing).

Such a phase (or phases) is undertaken for varying purposes, among which is to make audio, video, and/or audio/video content easier to work with, more navigable, more easily searched, and more orderly during the editing process, such that it enables as much efficiency, ease, swiftness, and/or clarity as possible during the editing process, and being of particular importance to the part of the editing process that involves the identification of moments in audio, video, and/or audio/video content that are of interest or disinterest to any person or persons undertaking the editing process. Such a phase (or phases) is also helpful to and supports the execution of any part of the editing process that involves the subtitling/captioning of audio, video, and/or audio/video content.

Such a phase (or phases), although helpful in enabling efficiency, ease, swiftness, and/or clarity during the editing process, is itself a very time-consuming, inefficient, and largely (or wholly) manual phase (or phases), requiring significant manual human effort. Even if portions of such a phase (or phases) involve automation, the process remains time-consuming, inefficient, and reliant on significant manual human effort. Such a phase's (or phases') component parts (logging, organizing, transcribing, and/or subtitling/captioning audio, video, and/or audio/video content) are parts whose execution are undertaken with some amount (or large amounts) of independence from each other, rendering them partially or wholly separate steps from one another, further contributing to this phase's (or phases') time-consuming, inefficient, and largely (or wholly) manual nature, as well as contributing to its reliance on significant manual human effort, even if portions of such a phase (or phases) involve automation.

Other fields such as law or security that may involve the transcription of large quantities of audio/video content and/or the navigation and/or organization of it to find a specific recording, action, or utterance, or a particular type of event or subject matter (in circumstances such as, but not limited to, video depositions or security footage), experience similar time-consuming, inefficient, and largely (or wholly) manual phases of work to create those transcriptions and/or identify and/or organize moments of interest within such audio/video content.

SUMMARY

Some embodiments of the invention include a non-transitory machine readable medium such as a multi-purpose computer or personal computer (or "user device") storing a software system that automatically logs, organizes, transcribes, and/or subtitles audio/video content. Audio/video content is analyzed by the software system and transcripts are automatically produced. Transcripts correspond to the analyzed content. Such content may be referred to as "clips". The software system can automatically identify instances and recurrences within transcripts and simultaneously identify those instances and recurrences in their corresponding clips. User input can identify an instance or instances within transcripts and/or their corresponding clips, and the software system can automatically identify recurrences of that instance or instances. In some embodiments, identifications are made with demarcations of content in particular views within the GUI. Identification of instances and/or recurrences enables the software system to automatically organize the identified (or demarcated) content into audio, video, and/or audio/video sequences (or files readable as such). In some embodiments, transcripts can be displayed in an amalgamated transcript mode that displays those transcripts in an arrangement, amalgamation, duplication, division, and/or trimming that matches the arrangement, amalgamation, duplication, division, and/or trimming of their corresponding clip or clips in a sequence. In some embodiments, subtitles/captions can be generated automatically by the software system from transcripts or amalgamated transcripts. In some embodiments, metadata can be applied to categorize, classify, label, and/or mark demarcations, or search and/or navigate clips and/or portions of clips. In some embodiments, metadata may be applied such that the metadata can be read as markers by audio, video, and/or audio/video editing software and such that those markers can be included in the audio, video, and/or audio/video sequences (or files readable as such) that the software system has organized the identified (or demarcated) content into. Such markers can be designated with text automatically generated by the software system or custom text entered by the user. Markers included in organized sequences of clips created automatically by the software system from demarcated content can be placed in alignment with the beginning, duration, or ending of demarcations. In some embodiments, audio/video sequences of organized content can be generated from clips navigated and/or searched using metadata. In some embodiments, audio/video sequences of organized content can be generated from clips navigated and/or searched using a loaded screenplay. In some embodiments, audio/video sequences of organized content can be generated from demarcations of automatically identified instances and recurrences that take place between "action" and "cut". In some embodiments, audio/video sequences of organized content can be generated from demarcations of user identified instances and automatically identified recurrences of those instances.

Described is a software system that automatically logs, organizes, and transcribes audio and video content with an interactive graphical user interface that is displayed on a monitor to enable user input, a software component that applies speech-to-text AI to analyze one or more audio and/or audio/video clips, another software component that applies the results of the analysis or analyses performed by the AI and uses those results to create a transcript or transcripts of the audio portions of the clip or clips that underwent analysis that are time-synced with the clip or clips to which they correspond and can be played back in sync and with simultaneity with the corresponding clip or clips, another software component that can automatically identify instances and recurrences of events in the transcript or transcripts and thereby automatically identify instances and recurrences of events in their corresponding clip or clips to enable automated logging and/or organizing of the clip or clips according to criteria determined by user input, and such that instances and recurrences of events may include, but are not limited to, an utterance, utterances, a word, words, phrases, a letter, letters, dialogue, subjects, topics, and/or text, and such that user input can identify an instance or instances, and the software system can automatically identify recurrences of the instance or instances, and such that individual instances and individual recurrences can be individually demarcated with an in and out point, and such that in and out points can be placed in the transcript or transcripts and the corresponding clip, clips, or a sequence of corresponding clips at corresponding moments, and such that the in and out points can be applied automatically by the software system, and such that more than one set of in and out points can co-exist simultaneously across a transcript, transcripts, clip, clips, or a sequence of clips, and such that the in and out points can enable user input to configure playback of the clip or clips or sequence of clips and their corresponding transcript or transcripts to automatically skip any content not demarcated between an in and an out point, and such that a file or files readable by audio, video, and/or audio/video editing software as audio, video, and/or audio/video sequences can be generated automatically, and such that the generated file or files can be configured by user input to contain just the content that is demarcated between an in and an out point.

The software component that applies speech-to-text AI to analyze one or more audio and/or audio/video clips can be configured by user input to restrict analysis to one or more specific audio tracks contained within the audio portions of the clip or clips. User input can restrict transcription of one or more audio and/or audio/video clips to one or more specific sections of a clip, clips, or sequence of clips. The text of the transcript or transcripts can be edited, revised, and/or modified by user input. Multiple transcripts can correspond to one clip and user input can define which of the multiple transcripts is displayed for any one clip. Such a transcript or transcripts can be configured by user input to include or exclude designations for individual speakers, and designations can be automatically applied and/or defined by user input. Such transcript or transcripts can be exported into one or more printable and/or editable documents.

User input can determine how similar a recurrence must be to an instance for the software system to automatically identify a recurrence as a recurrence of an instance. The software component that can automatically identify instances and recurrences of events in a transcript or transcripts and thereby automatically identify instances and recurrences of events in their corresponding clip or clips can be configured by user input to automatically identify just instances and recurrences of events that take place between instances and/or recurrences of the words "action" and "cut", such that the software system can automatically identify both instances and recurrences where instances and recurrences take place between instances and/or recurrences of the words "action" and "cut". In and out points can be applied automatically to a clip, clips, or a sequence of clips simultaneously as they are applied to their corresponding transcript or transcripts and in and out points can be applied automatically to a transcript or transcripts simultaneously as they are applied to their corresponding clip, clips, or a sequence of clips.

Individual instances and their corresponding recurrences can be automatically grouped together separately from other instances and their corresponding recurrences, from which a file or files readable by audio, video, and/or audio/video editing software as audio, video, and/or audio/video sequences can be generated automatically, and the generated file or files can be configured by user input to contain just the content that is part of one or more specific groups and demarcated between an in and an out point. Individual instances and individual recurrences can also be grouped freely according to user preference, and likewise, a file or files readable by audio, video, and/or audio/video editing software as audio, video, and/or audio/video sequences can be generated automatically, and the generated file or files can be configured by user input to contain just the content that is part of one or more specific groups and demarcated between an in and an out point. In and out points can be applied manually by user input. Manually applied in and out points can be applied to demarcate an instance and the demarcation of such an instance enables the software system to automatically identify recurrences of such a demarcated instance. Recurrences can be automatically demarcated by the software system between in and out points. Multiple sets of in and out points can be applied manually by user input. Multiple sets of in and out points can co-exist simultaneously. Multiple sets of in and out points can be applied by user input to individually demarcate separate instances, thereby enabling the software system to automatically identify recurrences of multiple instances. Recurrences can be automatically demarcated by the software system between in and out points. Instances can be automatically grouped with their corresponding recurrences.

The duration of one or more demarcations created by in and out points can be customized by user input. In and/or out points can be individually or collectively moved to change the overall duration of one or more demarcations and/or the exact point at which one or more in and/or out points are positioned. One or more individual demarcations can be selected by user input to enable user input to modify the parameters and/or settings of one or more selected individual demarcations. One or more individual groups of demarcations can be selected by user input to enable user input to modify the parameters and/or settings of the individual demarcations within one or more selected groups with simultaneity.

Another software component can automatically generate a file or files readable by audio, video, and/or audio/video editing software as subtitles/captions from a transcript or transcripts and/or portions thereof, such that the file or files readable by audio, video, and/or audio/video editing software as subtitles/captions contain the text of the transcript or transcripts and/or portions thereof from which they were generated, and such that the file or files readable by audio, video, and/or audio/video editing software as subtitles/captions are time-synced with the clip or clips that correspond to the transcript or transcripts, or portions thereof, from which the file or files readable by audio, video, and/or audio/video editing software as subtitles/captions were generated.

The interactive graphical user interface provides the user with four time-synced views that can display and/or playback one or more audio, video, and/or audio/video clips or a sequence of audio, video, and/or audio/video clips and any corresponding transcript, transcripts, or amalgamated transcript. One of those views can display and/or playback the video portions of such a clip or clips or sequence of clips. The second of those views can display and/or playback the audio portions of such a clip or clips or sequence of clips as a waveform or waveforms. The third of those views can display and/or playback any transcript, transcripts, or amalgamated transcript that corresponds to such a clip or clips or sequence of clips. The user has the ability to toggle between those three of four views. The fourth of those views is a timeline view synced to the other three views. The fourth view remains visible while any of the first three views are visible. During playback of a clip, clips, or sequence of clips that contain audio content, such audio content is audible across all views.

The interactive graphical user interface includes a find and replace tool that can be applied by the user to find and/or replace specific content in a transcript or transcripts and thereby enables the find and replace tool to be applied by the user to simultaneously search the audio and/or video content of any clip, clips, or a sequence of clips that correspond to a searchable transcript or transcripts.

Another software component applies timecode data so that such a transcript or transcripts can be automatically displayed by the software system in a mode in which such a transcript or transcripts appear arranged, amalgamated, duplicated, divided, and/or trimmed such that their arrangement, amalgamation, duplication, division, and/or trimming matches the arrangement, amalgamation, duplication, division, and/or trimming of their corresponding clip or clips in an audio, video, and/or audio/video sequence or a file readable by audio, video, and/or audio/video editing software as an audio, video, and/or audio/video sequence and such that the transcript or transcripts displayed in this mode appear as one transcript that functions as a transcript of the particular arrangement, amalgamation, duplication, division, and/or trimming of the corresponding clip or clips in the audio, video, and/or audio/video sequence or file readable by audio, video, and/or audio/video editing software as an audio, video, and/or audio/video sequence and that is time-synced with the arrangement, amalgamation, duplication, division, and/or trimming of the corresponding clip or clips in the audio, video, and/or audio/video sequence or file readable by audio, video, and/or audio/video editing software as an audio, video, and/or audio/video sequence and can be played back in sync and with simultaneity with the arrangement, amalgamation, duplication, division, and/or trimming of the corresponding clip or clips in the audio, video, and/or audio/video sequence or file readable by audio, video, and/or audio/video editing software as an audio, video, and/or audio/video sequence. The arrangement, amalgamation, duplication, division, and/or trimming of such a transcript or transcripts that appear as one transcript can be exported into one or more printable and/or editable documents.

Another software component can automatically generate a file or files readable by audio, video, and/or audio/video editing software as subtitles/captions from such an arrangement, amalgamation, duplication, division, and/or trimming of such a transcript or transcripts that appear as one transcript such that the file or files readable by audio, video, and/or audio/video editing software as subtitles/captions contain the text of the arrangement, amalgamation, duplication, division, and/or trimming of the transcript or transcripts, and such that the file or files readable by audio, video, and/or audio/video editing software as subtitles/captions are time-synced with the arrangement, amalgamation, duplication, division, and/or trimming of the clip or clips in the audio, video, and/or audio/video sequence or file readable by audio, video, and/or audio/video editing software as an audio, video, and/or audio/video sequence that correspond to the arrangement, amalgamation, duplication, division, and/or trimming of the transcript or transcripts from which the file or files readable by audio, video, and/or audio/video editing software as subtitles/captions were generated.

Metadata can be generated by the software system that is readable by audio, video, and/or audio/video editing software as a marker or markers, and such that the metadata can be included in the marker or markers as text, and such that the metadata and/or marker or markers can be made part of the file or files readable by audio, video, and/or audio/video editing software as audio, video, and/or audio/video sequences, and such that the metadata and/or marker or markers can be automatically placed at moments defined by user input and/or the in point, out point, or for the duration of a demarcation or demarcations. The text of such metadata and/or such marker or markers can be customized by user input to automatically correspond to the first few words of a transcribed utterance, utterances, or recurrence within the demarcation whereat such metadata and/or such marker or markers are placed and/or automatically correspond to the last few words of a transcribed utterance, utterances, or recurrence within the demarcation whereat such metadata and/or such marker or markers are placed. The text of such metadata and/or such marker or markers can be customized by user input to automatically correspond to the file name of one or more clips partially or wholly within the demarcation whereat such metadata and/or such marker or markers are placed. The text of such metadata and/or such marker or markers can be customized by user input to automatically follow a numerical system in which the metadata and/or marker or markers that are placed at an instance or recurrence that occurs chronologically first, relative to its corresponding instance or recurrences, contains text that has the number "1", and in which the metadata and/or marker or markers that are placed at an instance or recurrence that occurs chronologically second, relative to its corresponding instance or recurrences, contains text that has the number "2", and so on. The text of such metadata and/or such marker or markers can be customized by user input to include the scene and/or take number, such that the scene and/or take number is extrapolated from the file name of one or more clips partially or wholly within the demarcation whereat such metadata and/or such marker or markers are placed. Such extrapolation is performed automatically by the software system, and such that the extrapolation occurs when such file name follows one or more naming conventions that indicate the scene and/or take number. The text of such metadata and/or such marker or markers can be customized by user input to include the scene and/or take number, such that optical character recognition is applied as a means of extrapolating the scene and/or take number from one or more clips partially or wholly within the demarcation whereat such metadata and/or such marker or markers are placed. Such extrapolation is performed automatically by the software system, and such optical character recognition is applied to extrapolate the scene and/or take number from the slate and/or clapperboard as it appears within the visual content of such one or more clips that are partially or wholly within the demarcation whereat such metadata and/or such marker or markers are placed, and when the slate and/or clapperboard appears within such visual content, and when the slate and/or clapperboard appears within or without the demarcation. The text of such metadata and/or such marker or markers can be customized by user input to include the scene and/or take number, such that pre-existing metadata is applied as a means of extrapolating the scene and/or take number. Such extrapolation is performed automatically by the software system, and when pre-existing metadata indicates the scene and/or take number of one or more clips partially or wholly within the demarcation whereat such metadata and/or such marker or markers are placed. The text of such metadata and/or such marker or markers can be customized by user input to include custom text.

The system may also function such that computer vision and/or image recognition is applied to interpret the visual content of a clip, clips, or sequence of clips to produce metadata that can specify and/or classify the visual content of a clip, clips, or a sequence of clips, or specific spans of time therein, such that such specifications and/or classifications can take the form of keywords, tags, labels, phrases, sentences, and/or other text that can describe and/or correspond to specific spans of time of visual content within such clip, clips, or sequence of clips, and such that visual content interpreted may include objects, subjects, actions, behaviors, aesthetics, light, colors, motion, stillness, shot type, shot distance from subject, shot angle, emotional expression, and/or any other kind of visual content. The system may also function such that sound recognition is applied to interpret the sound content of a clip, clips, or sequence of clips to produce metadata that can specify and/or classify the sound content of a clip, clips, or a sequence of clips, or specific spans of time therein, such that such specifications and/or classifications can take the form of keywords, tags, labels, phrases, sentences, and/or other text that can describe and/or correspond to specific spans of time of sound content within such clip, clips, or sequence of clips, and such that sound content interpreted may include types of sounds, types of speech, object specific sound events, subject specific sound events, clatter, actions, tones, aesthetics, situationally unique sounds, emotional expression in sound and/or speech and/or action, and/or any other kind of sound content. Pre-recorded unique tones or other sounds might be used during shooting/recording to help the software system automatically identify specific spans of time within a clip, clips, or sequence of clips to improve and/or expedite demarcation, and such that the software system can be directed by user input to recognize a specific tone or other sound as an indication to create a demarcation in point, and such that the software system can be directed by user input to recognize a specific tone or other sound as an indication to create a demarcation out point.

The system may also function such that metadata generated by the software system can enable user input to search, navigate, and/or select specific metadata, and such that such metadata can be customized and/or added to by user input, and such that such metadata corresponds to specific clips, and such that such metadata can be set to correspond to specific clips automatically by the software system, and such that such search, navigation, and/or selection of specific metadata thereby enables the software system to automatically present the user with just the clips that correspond to such search, navigation, and/or selection of specific metadata, from which a file or files readable by audio, video, and/or audio/video editing software as audio, video, and/or audio/video sequences can be generated automatically, and such that such file or files can be configured by user input to contain just the clip or clips that correspond to such search, navigation, and/or selection of specific metadata, and such that such metadata can take the form of keywords, tags, labels, phrases, sentences, and/or other text. The system may also function such that metadata can correspond to specific spans of time in a clip or clips, and such that such metadata can be set to correspond to specific spans of time in a clip or clips automatically by the software system, and such that such metadata can be customized and/or added to by user input, and such that such specific spans of time correspond to a specific timecode or timecodes, thereby enabling the software system to automatically present the user with just the spans of time within a clip or clips that correspond to such search, navigation, and/or selection of specific metadata, from which a file or files readable by audio, video, and/or audio/video editing software as audio, video, and/or audio/video sequences can be generated automatically, and such that such file or files can be configured by user input to contain just the spans of time within a clip or clips that correspond to such search, navigation, and/or selection of specific metadata, and such that such metadata can take the form of keywords, tags, labels, phrases, sentences, and/or other text.

Margins can be automatically generated and applied to a demarcation by the software system, and such that there is an in margin that is distinct from an out margin, and such that such in margin is positioned right after a demarcation's in point, and such that such out margin is positioned right before a demarcation's out point. When a demarcation is the demarcation of an instance, that demarcation's in margin has a duration that can be defined by the amount of time between that demarcation's in point, and the beginning of the first transcribed utterance to appear within that demarcation. When a demarcation is the demarcation of an instance, that demarcation's out margin has a duration that can be defined by the amount of time between the end of the last transcribed utterance to appear within that demarcation and that demarcation's out point. When a demarcation is the demarcation of a recurrence, that demarcation's in margin has a duration that can be defined by the duration of the in margin of that demarcation's corresponding instance demarcation. When a demarcation is the demarcation of a recurrence, that demarcation's out margin has a duration that can be defined by the duration of the out margin of that demarcation's corresponding instance demarcation. When a demarcation is the demarcation of an instance, that demarcation's in margin is automatically applied in such a way that the in margin ends just as the first transcribed utterance to appear within that demarcation begins. When a demarcation is the demarcation of an instance, that demarcation's out margin is automatically applied in such a way that the out margin begins just as the last transcribed utterance to appear within that demarcation ends. When a demarcation is the demarcation of a recurrence, that demarcation's in margin is automatically applied in such a way that the in margin ends just as the recurrence within that demarcation begins. When a demarcation is the demarcation of a recurrence, that demarcation's out margin is automatically applied in such a way that the out margin begins just as the recurrence within that demarcation ends.

The system may also function such that the duration of such margins can be customized by user input. Such margins can be offset from their initial position by user input, and such that the offsetting that is applied to an in margin automatically applies the same offsetting to that in margin's corresponding in point, and such that the offsetting that is applied to an out margin automatically applies the same offsetting to that out margin's corresponding out point, and such that the in and out points maintain their positions relative to their corresponding margins. In margins can be anchored to instances and/or recurrences of the word "action" and out margins can be anchored to instances and/or recurrences of the word "cut", such that in margins begin just as a transcribed utterance of "action" ends and such that out margins end just as a transcribed utterance of "cut" begins.

The system may also function such that a script or screenplay can be loaded into the software system by the user. Loading a script or screenplay into the software system enables improved transcript accuracy. The system may also function such that loading a script or screenplay into the software system enables speaker designation to transcripts, and such that speaker designations can be automatically derived from the script or screenplay. Loading a script or screenplay into the software system enables a software component in which such script or screenplay can be displayed by the interactive graphical user interface, and such that the script or screenplay can be navigated by the user, and such that sections of the script or screenplay can be demarcated between an in and an out point by the user, and such that performing such demarcation enables the software system to automatically identify instances and recurrences of events within any transcript or transcripts that correspond to or are the same or similar to the section or sections of the script or screenplay that are demarcated between an in and an out point, thereby enabling the software system to automatically identify instances and recurrences of events within any audio and/or audio/video clips that correspond to such transcript or transcripts that correspond to or are the same or similar to the section or sections of the script or screenplay that are demarcated between an in and an out point, and such that such identification of such instances and/or recurrences of events within such audio and/or audio/video clips can be used to enable the software system to automatically generate a file or files readable by audio, video, and/or audio/video editing software as audio, video, and/or audio/video sequences, and such that such file or files can be configured by user input to contain just such instances and recurrences of events within any audio and/or audio/video clips that correspond to such instances and recurrences of events within such transcript or transcripts that correspond to or are the same or similar to the section or sections of the script or screenplay that are demarcated between an in and an out point. User input can define how similar such instances and/or recurrences must be to sections of the script or screenplay demarcated between an in and an out point for the software system to automatically identify such instances and/or recurrences as corresponding to such section or sections. More than one set of in and out points can co-exist simultaneously across the script or screenplay.

Such instances and recurrences of events within any audio and/or audio/video clips that correspond to such instances and recurrences of events within such transcript or transcripts that correspond to or are the same or similar to a specific section of such script or screenplay demarcated between an in and an out point can be automatically grouped together separately from other instances and recurrences of events within any audio and/or audio/video clips that correspond to other instances and recurrences of events within such transcript or transcripts that correspond to or are the same or similar to other sections of such script or screenplay demarcated between an in and an out point, from which a file or files readable by audio, video, and/or audio/video editing software as audio, video, and/or audio/video sequences can be generated automatically, and such that such file or files can be configured by user input to contain just the content that is part of one or more specific such groups.

The system may also function such that optical character recognition is applied as a means of automatically extrapolating the scene and/or take number of a clip or clips, and such that the optical character recognition is applied to extrapolate the scene and/or take number from the slate and/or clapperboard, when such slate and/or clapperboard appears in the visual content of one or more clips, and such that the extrapolation is applied as a means of automatically identifying instances and recurrences of events within any video, and/or audio/video clips that correspond to or are the same or similar to a section or sections of such script or screenplay, when such script or screenplay contains scene numbers. The system may also function such that scene and/or take numbers are extrapolated from the file name of one or more clips, and such that such extrapolation is performed automatically by the software system, and such that such extrapolation occurs when such file name follows one or more naming conventions that indicate the scene and/or take number, and such that such extrapolation is applied as a means of automatically identifying instances and recurrences of events within any audio and/or audio/video clips that correspond to or are the same or similar to a section or sections of such script or screenplay, when such script or screenplay contains scene numbers.

The preceding summary is intended as a brief overview of some embodiments of the invention. It is not meant to be an introduction or overview of all inventive subject matter disclosed in this document. The Detailed Description that follows and the Drawings that are referred to in the Detailed Description will further describe the embodiments. Moreover, the claimed subject matters are not limited by the illustrative details in the Summary, Detailed Description, and the Drawings, but rather are to be defined by the appended claims, because the claimed subject matters can be embodied in other specific forms without departing from the spirit of the subject matters.

DRAWING REFERENCE NUMERALS 200 view frame
205 video view
210 video view button
215 waveform view
216 audio track checkbox tools
220 waveform view button
225 transcript view
230 transcript view button
235 timeline view
240 panel of playback tools
300 data section
305 browse save location button
310 browse existing data button
315 demarcating tool
320 demarcation
325 playback control setting
330 select tool
335 select outline
340 linked selection setting
350 transcribe section
355 source type display 360 restriction setting
365 transcribe button
370 transcript display grid
375 transcript radio buttons
380 edit field
385 find and replace tool
390 export transcript section
395 export transcript button
396 export transcript format selection tool
400 search blip
500 in point
505 out point
510 in margin
515 out margin
520 panel of grouping tools
525 linked selection setting
530 invert selection setting
600 stringout section
610 detection method setting
615 similarity bar
620 apply all checkbox tools
625 margin control tools and settings
630 demarcation anchor setting
700 first first/last utterance anchoring example
705 first action/cut anchoring example
710 action identifier
715 cut identifier
720 preview marker
800 output sequence controls
805 output groups to separate sequences setting
810 output sequence name setting
815 output sequence display grid
820 sequence name field
825 marker control section
830 add markers tool
835 preview markers checkbox
840 marker name control section
841 first part marker name control
842 first custom marker name field
843 second part marker name control
844 second custom marker name field
845 third part marker name control
846 third custom marker name field
850 marker comments control section
851 first part marker comment control
852 first custom marker comment field
853 second part marker comment control
854 second custom marker comment field
855 third part marker comment control
856 third custom marker comment field
860 generate stringout button
900 first example sequence
905 second example sequence
910 third example sequence
1000 amalgamated transcript mode
1100 first example of a sequence of one or more clips
1200 captions section
1205 generate captions button
1210 caption display grid
1215 source type column
1220 caption icon
1300 video display
1305 video display of a subtitle/caption file
1400 fourth example sequence
1405 first example of a dragged caption icon
1410 fifth example sequence
1415 second example of a dragged caption icon
1500 metadata search and navigation section
1505 metadata search tool
1510 metadata display grid
1515 metadata items
1520 example metadata item selection
1525 media display grid
1530 show trimmed results checkbox
1535 generate metadata stringout button
1600 conceptual representation of a user device
1605 conceptual representation of the software system
1610 conceptual representation of provision of a clip or clips
1615 conceptual representation of the analysis of a clip or clips
1620 conceptual representation of the creation of a transcript or transcripts
1625 conceptual representation of the creation of metadata
1630 conceptual representation of enabled captioning
1635 conceptual representation of user identification of instance(s)
1640 conceptual representation of the software system scanning for same or similar moments
1645 conceptual representation of the software system automatically identifying recurrence(s)
1650 conceptual representation of the demarcation of instance(s) and recurrence(s)"
1655 conceptual representation of marker creation
1660 alternate conceptual representation of user provision of a screenplay
1665 alternate conceptual representation of search and navigation of clip(s) using screenplay
1670 alternate conceptual representation of user selection of clip(s)
1675 conceptual representation of metadata search and navigation of clip(s)
1680 conceptual representation of user selection of clip(s)
1685 conceptual representation of user provision of a screenplay
1690 conceptual representation of search and navigation of clip(s) using screenplay
1692 conceptual representation of automatic scanning for moments that are the same or similar to each other
1694 conceptual representation of automatic identification of instance(s) and recurrence(s)
1696 conceptual representation of organized content
1700 first example transcript
1705 first example clip
1710 second example transcript
1715 second example clip
1720 trimmed first example transcript
1725 trimmed first example clip
1730 trimmed second example transcript
1735 trimmed second example clip
1740 amalgamated transcript example
1745 sequence of clips example
1800 screenplay search and navigation section
1805 screenplay search field
1810 screenplay display area
1815 screenplay demarcation
1820 screenplay media display grid
1825 generate screenplay stringout button
1900 hardware block diagram
1910 database management system
1920 programs
1930 computer
1940 audio input devices
1950 video input devices

BRIEF DESCRIPTION OF DRAWINGS

The novel features of the inventive subject matter are set forth in the appended claims. However, for purposes of illustration, the following figures show embodiments according to the inventive subject matter.

DETAILED DESCRIPTION

In the following detailed description of the invention, representative embodiments are shown. The specific embodiments are meant to be illustrative and not limit the scope of the invention and the various ways it may be embodied. Some embodiments of the invention include a non-transitory machine readable medium such as a multipurpose computer or personal computer (hereafter referred to as "user device") storing a software system that automatically logs, organizes, transcribes, and subtitles/captions audio, video, and/or audio/video content.

Figure 1:
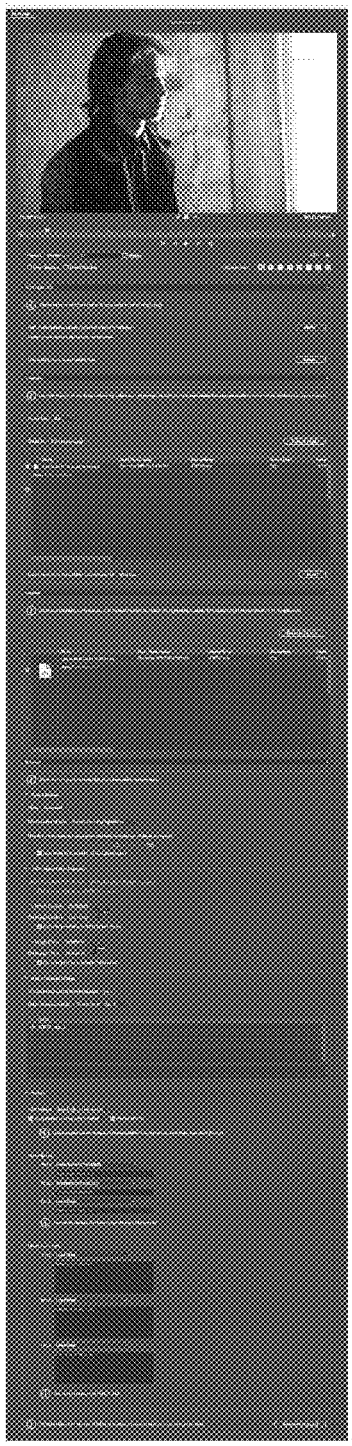
FIG. 1 illustrates a graphical user interface (GUI) of a software system that automatically logs, organizes, transcribes, and subtitles/captions audio, video, and/or audio/video content of some embodiments.

Now referring to FIG. 1, some embodiments include an interactive graphical user interface (hereafter referred to as "GUI") that includes tools and settings for user interaction and input at the user device, the overall view of which is depicted in FIG. 1. The overall view shown in FIG. 1 is shown for illustrative purposes only and its depiction is not meant to limit the scope of the invention and the various ways it may be embodied. One of ordinary skill will recognize that the overall view of the GUI depicted in FIG. 1 is one of many possible GUIs. Furthermore, areas of the GUI depicted in FIG. 1 can be scaled, resized, collapsed, hidden, and/or otherwise adjusted by user input. The GUI provides many ways for the user to interact with the software system. Some of these ways include tools and/or settings which provide the user with a means of executing the functions of the software system. These ways, including tools and/or settings, are detailed for illustrative purposes and to express some of many of the possible embodiments of that the user-facing tools can take to provide the user with the ability to interact with the software system and execute its functions. They are not meant to limit the scope of ways a user can interact with the software system and execute its functions or limit the manner in which a tool or setting might be expressed, formed, named, styled, or fashioned.

Figure 2A:
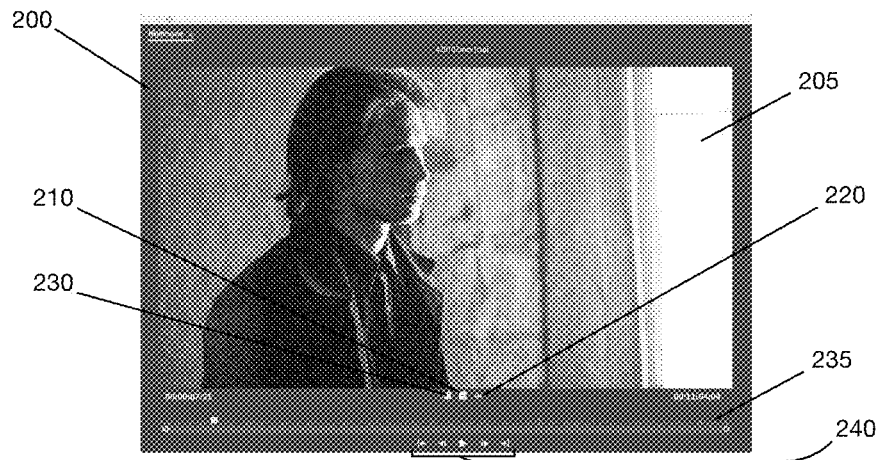
FIG. 2A illustrates a video view included in a graphical user interface (GUI) of some embodiments that the user can toggle to from two other views as well as a timeline view that remains visible for each of the togglable views.
Figure 2B:
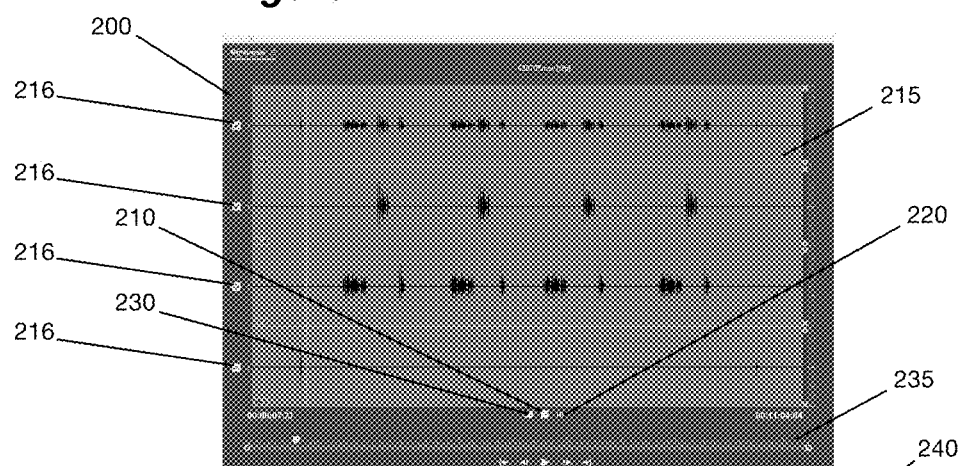
FIG. 2B illustrates a waveform view included in a graphical user interface (GUI) of some embodiments that the user can toggle to from two other views as well as said timeline view that remains visible for each of the togglable views.
Figure 2C:
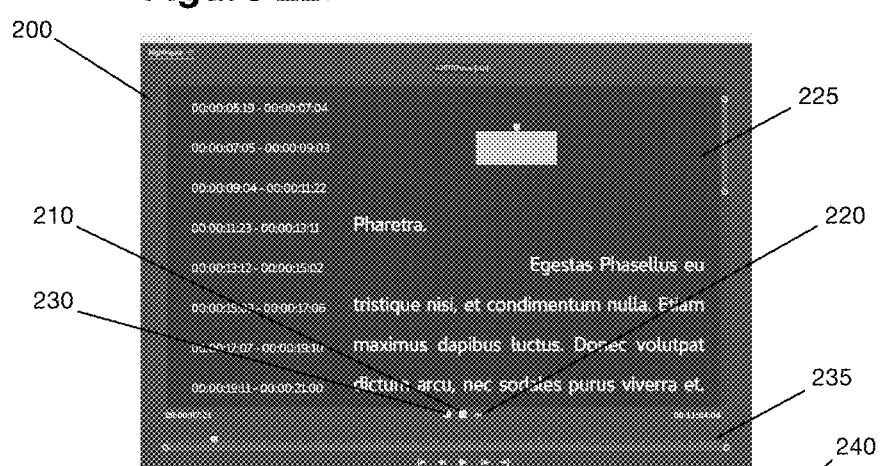
FIG. 2C illustrates a transcript view included in a graphical user interface (GUI) of some embodiments that the user can toggle to from two other views as well as said timeline view that remains visible for each of the togglable views.

Now referring to FIG. 2A, FIG. 2B, and FIG. 2C, FIG. 2A, FIG. 2B, and FIG. 2C depict the uppermost portion of the GUI first depicted in the overall view of FIG. 1. Its depiction in FIG. 2A, FIG. 2B, and FIG. 2C shows a closer view of a "view frame" 200 for viewing audio, video, and/or audio/video clips (hereafter referred to as "clips") or sequence of clips and their corresponding transcript or transcripts. The view frame 200 depicted in FIG. 2A, FIG. 2B, and FIG. 2C can be set by user input to display and/or playback a clip, clips, or sequence of clips in a, now referring to FIG. 2A individually, "video view" 205 (that displays the video portions of a clip, clips, or sequence of clips) (using a, now referring again to FIG. 2A, FIG. 2B, and FIG. 2C collectively, "video view button" 210), a, now referring to FIG. 2B individually, "waveform view" 215 (that displays the audio portions of a clip, clips, or sequence of clips in a waveform format) (using a, now referring again to FIG. 2A, FIG. 2B, and FIG. 2C collectively, "waveform view button" 220), or a, now referring to FIG. 2C individually, "transcript view" 225 (that shows the transcript or transcripts of a clip, clips, or sequence of clips) (using a, now referring again to FIG. 2A, FIG. 2B, and FIG. 2C collectively, "transcript view button" 230). These views, when displaying the same clip, clips, or sequence of clips or their corresponding transcript or transcripts, remain in time-sync with each other, and the user has the ability to toggle between each view, and time-sync is maintained when toggling from one view to another. A "timeline view" 235 that is synced with the video view 205, waveform view 215, and transcript view 225 is also provided and remains visible in the video view 205, waveform view 215, and transcript view 225. A "panel of playback tools" 240 is also provided that allows the user to playback, pause, and/or navigate the displayed clip, clips, or sequence of clips.

Figure 3:
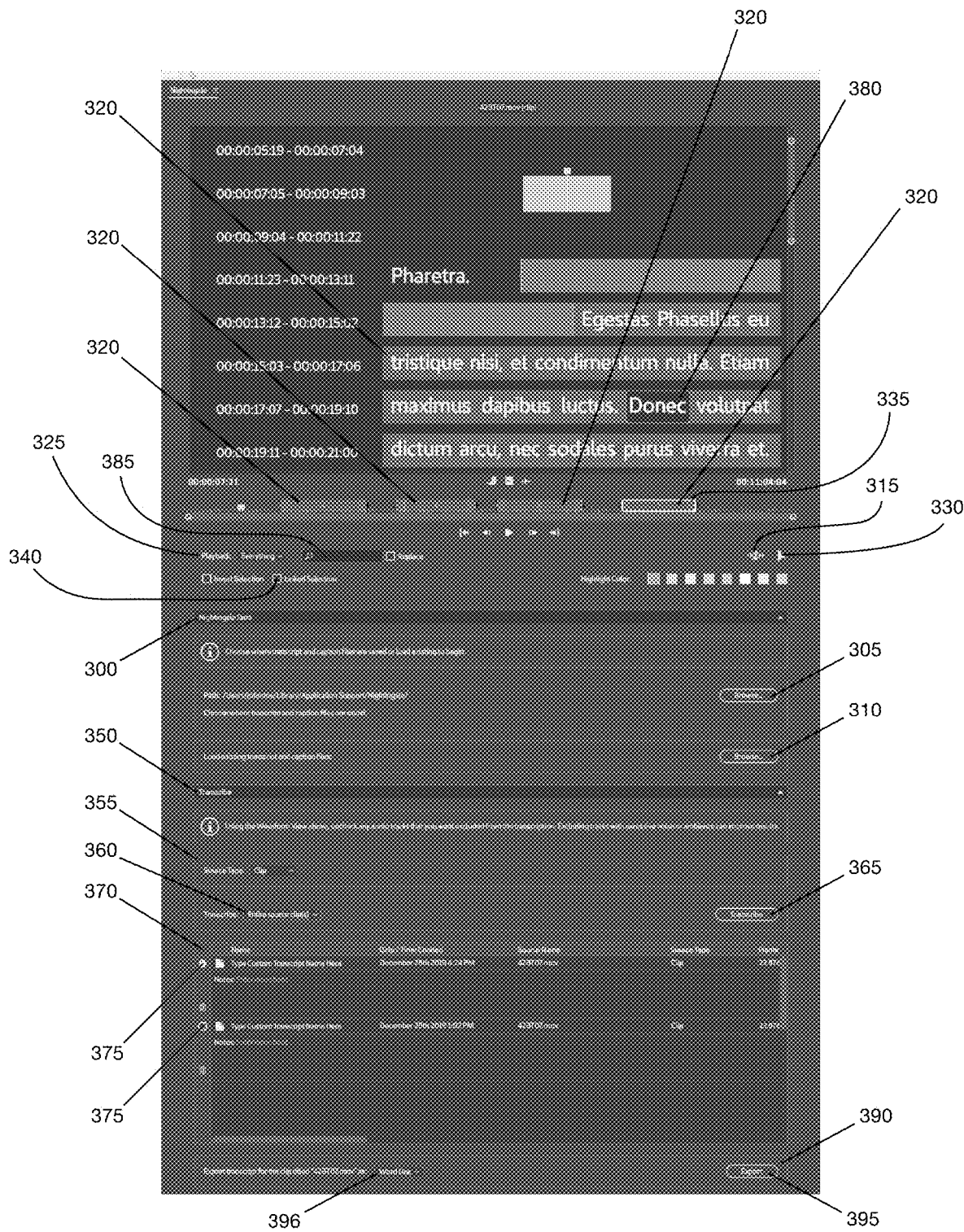
FIG. 3 illustrates a data section and tools and settings contained in it, a transcribe section and tools and settings contained in it, user identification of an instance, the software system's automatic identification of recurrences, demarcations, demarcation selection, and general tools and settings included in a graphical user interface (GUI) of some embodiments.
Figure 4A:
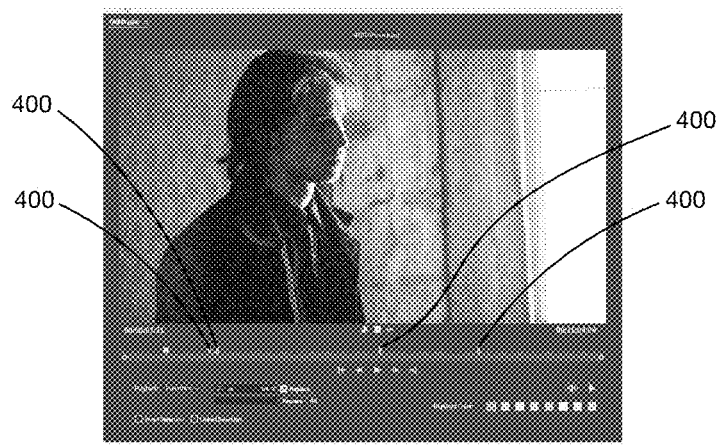
FIG. 4A illustrates an active search using a find and replace tool, as seen in the video view.
Figure 4B:
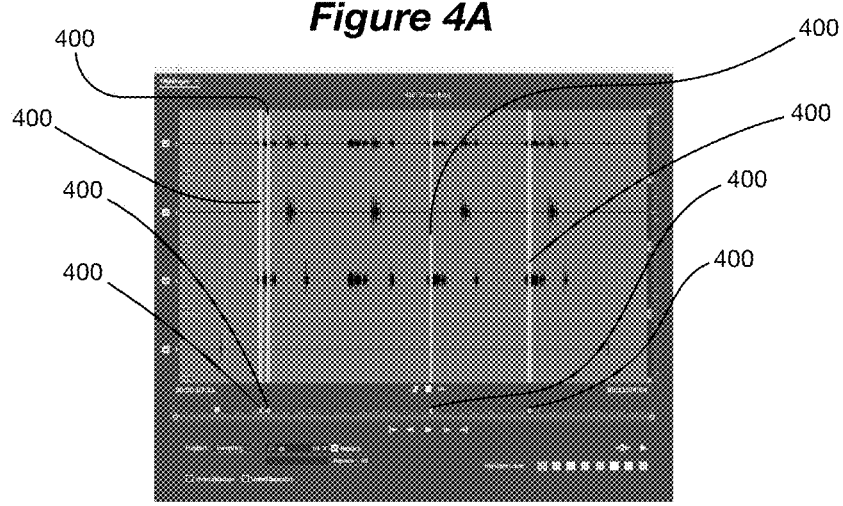
FIG. 4B illustrates an active search using the find and replace tool, as seen in the waveform view.
Figure 4C:
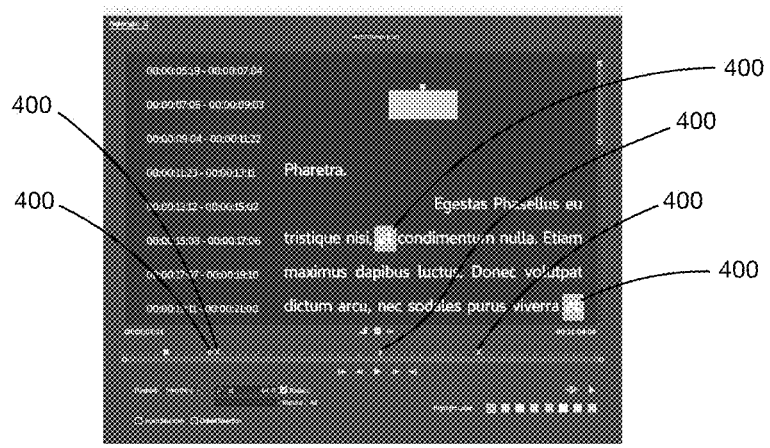
FIG. 4C illustrates an active search using the find and replace tool, as seen in the transcript view.

At the user device, the user can select a clip, clips, or a sequence of clips stored on (or accessible though) the user device. The user clicks a visual representation of a clip, clips, or sequence of clips to make a selection. Such representations of a clip, clips, or sequence of clips may be part of the user device UI, part of a non-linear editing system's UI stored on (or accessible through) the user device, or part of an embodiment of the inventive subject matter that uses one or another of many possible GUIs. This manner of selection is just one possible manner of selection, and user selection of a clip will not be limited to this particular manner of selection. The view frame 200 will display the user selection. FIG. 3 depicts the "data section" 300 and the "transcribe section" 350. The user can direct the software system to automatically transcribe the selected clip, clips, or sequence of clips by pressing the "transcribe button" 365. The software system automatically transcribes the selected by applying speech-to-text AI to analyze the selected. This analysis generates a transcript or transcripts of the selected that include time-stamps allowing the software system to reinterpret and/or reformat the transcript or transcripts for display in the transcript view 225 in a manner that is time-synced with their corresponding clip, clips, or sequence of clips and can be played back in sync and with simultaneity with their corresponding clip, clips, or sequence of clips. In some embodiments, transcript data produced by the speech-to-text AI and/or reinterpreted and/or reformatted by the software system and/or subtitle/caption files/data can be directed by the user to be saved to a particular directory on (or accessible through) the user device by using the "browse save location button" 305. In some embodiments, existing transcript data produced by the speech-to-text AI and/or reinterpreted and/or reformatted by the software system and/or subtitle/caption files/data can be loaded into the software system using the "browse existing data button" 310. In some embodiments, now referring again to FIG. 2B, the GUI provides a set of "audio track checkbox tools" 216 for the user to restrict the transcription of a clip, clips, or sequence of clips to a specific track or tracks of audio. In some embodiments, now referring again to FIG. 3, the GUI provides a "restriction setting" 360 that the user can apply to restrict transcription of one or more clips to just one or more specific sections of that clip or clips. In some embodiments, to apply this feature, the restriction setting 360 can be set by the user before transcription to read "only the parts of the clips that are used in the sequence" (or an alternate wording and/or condition), then the user selects (or has already selected) a sequence containing one or more clips (or one or more portions of one or more clips) for transcription, and hits the transcribe button 365 to initiate the restricted transcription. In some embodiments, if the user does not wish to restrict transcription to just one or more specific sections, the setting should be kept to read "entire source clip(s)" (or an alternate wording). The wordings of the restriction setting 360 and any other setting, tool, or illustration of text are for illustrative purposes only and are not meant to limit the scope of potential wordings. In some embodiments, the "source type display" 355 will display the word "clip" if a user has selected a clip, and will display the word "sequence" if a user has selected a sequence. In some embodiments, a clip or clips transcribed more than once can correspond to more than one transcript and the GUI provides a tool/setting for the user to toggle between which of those transcripts is displayed by the transcript view 225 for that clip or clips. In some embodiments, a "transcript display grid" 370 is provided that lists and/or visualizes for the user how many transcripts correspond to a selected clip. (The transcript display grid 370 in FIG. 3 depicts a clip with two corresponding transcripts, however, this number is not meant to be limiting, and more or less than two are possible.) The transcript display grid 370 provides a set of "transcript radio buttons" 375 for indicating which transcript is currently displayed by the transcript view 225 and for selecting (or toggling between) which transcript is displayed by the transcript view 225. The transcript with the filled-in (or selected) radio button is displayed in the transcript view 225. In some embodiments, the transcribe button 365 may read "transcribe again" if a selected clip, clips, or sequence of clips has already been transcribed. In some embodiments, the user is able to edit or modify the text of a transcript or transcripts by selecting (or double clicking) a word (or words), which creates and encloses the selected word (or words) in an "edit field" 380 that can accept replacement text that is input by the user. In some embodiments, the GUI includes a "find and replace tool" 385 that the user can enter text into as search parameters and use to search transcripts and/or their corresponding clips, as well as replace, edit, and/or modify the text of those transcripts. FIG. 4A depicts an active search in the video view 205, FIG. 4B depicts an active search in the waveform view 215, and FIG. 4C depicts an active search in the transcript view 225. During an active search, a "search blip" 400 will appear at any positive result, and the user can cycle through the results by hitting enter/return). Such cycling can be done in video view 205, waveform view 215, and/or transcript view 225 and the action is synced across all those views as well as the timeline view 235. In some embodiments, the GUI provides the user with a setting to include or exclude speaker designations and a tool for the user to manually define the designations or for the software system to automatically define them. In some embodiments, now referring again to FIG. 3, the GUI provides an "export transcript section" 390 for the user to export transcripts into one or more printable and/or editable document formats. The export transcript section 390 contains an "export transcript button" 395 that the user can click to export transcripts. An "export transcript format selection tool" 396 is provided that allows the user to choose the format a transcript is exported to.

Figure 6:
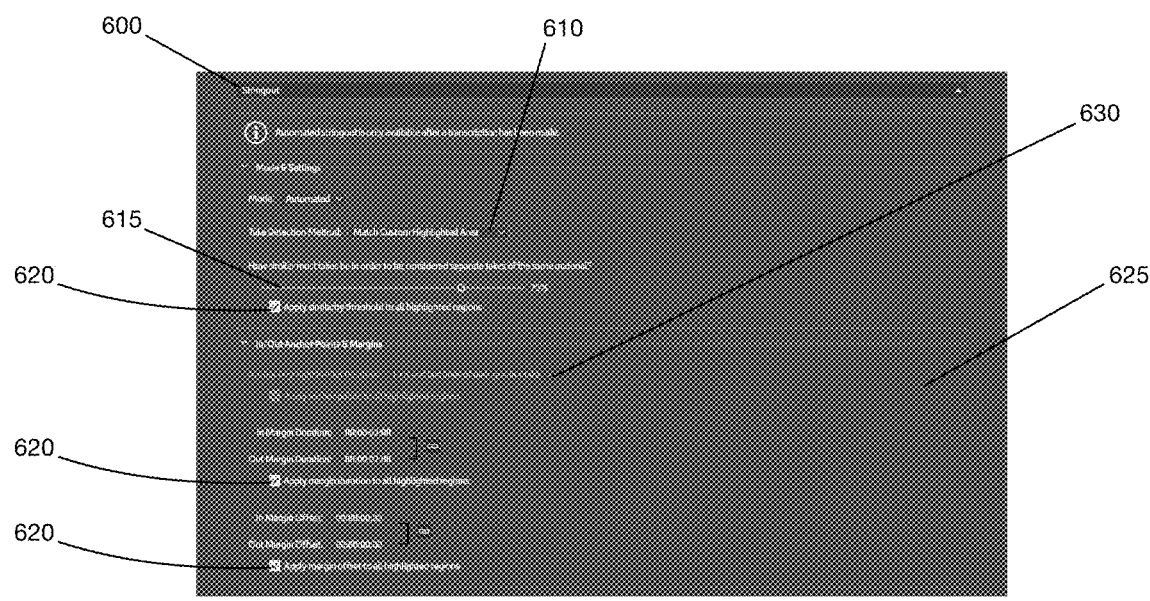
FIG. 6 illustrates a stringout section and tools and settings contained in it included in a graphical user interface (GUI) of some embodiments.

In some embodiments, the software system can be directed by user input at the user device to automatically organize clips, or portions of clips, that correspond to transcripts. Such organization can be customized according to user preference. In some embodiments, the user can identify a moment or moments in a transcript or transcripts (or their corresponding clip or clips) that contain at least one transcribed utterance (hereafter referred to as an "instance" or "instances") and such user identification can instruct the software system to automatically identify recurrences of that instance (or instances) in one or more transcripts and their corresponding clip or clips. An utterance, more broadly, may also be referred to as an "event". Instances and recurrences can occur in any order relative to each other. In some embodiments, now referring to FIG. 6, user identification of an instance for this purpose is possible by setting a "detection method setting" 610 to read "match custom instance", "match custom demarcation", "match custom highlighted area", or an alternate wording. In some embodiments, the detection method setting 610 is in a "stringout section" 600.

Figure 5:
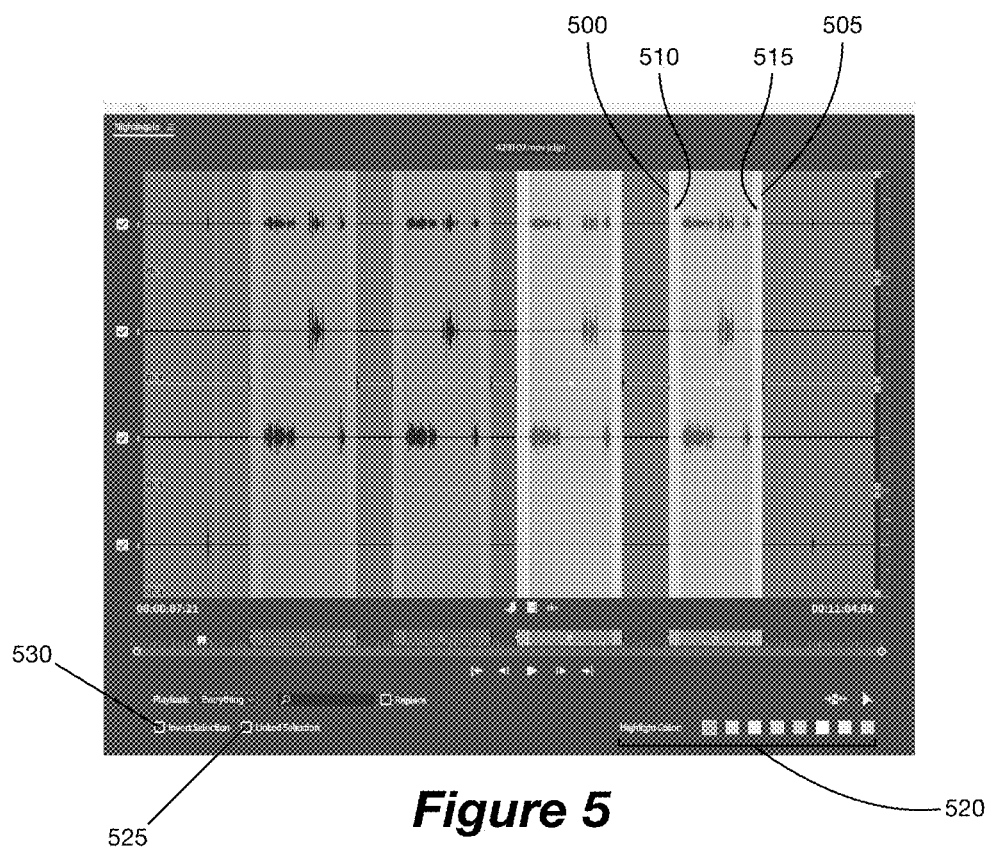
FIG. 5 illustrates in points, out points, in margins, out margins, a panel of grouping tools, grouped demarcations, and selection settings.

In some embodiments, now referring again to FIG. 3, a "demarcating tool" 315 is provided by the GUI that may be applied by the user for identification of an instance or instances through demarcation of such an instance or instances. The demarcating tool 315 can be activated by clicking on it. It can then be used by clicking and dragging across an area in the waveform view 215, transcript view 225, or timeline view 235 that contains at least one transcribed utterance. Clicking and dragging results in the creation of a "demarcation" 320 that will be viewable in the waveform view 215, the transcript view 225, and the timeline view 235. A demarcation 320 created in one view will be viewable in the other views. Referring now to FIG. 5, demarcations include an "in point" 500 and an "out point" 505 and may include an "in margin" 510 and "out margin" 515. Demarcations begin with their in point 500 and end with their out point 505. As shown in FIG. 5, multiple demarcations (or multiple sets of in and out points) can exist simultaneously. The software system can automatically identify recurrences of an instance or instances by automatically demarcating them.

A demarcation made to a moment in a clip gets automatically applied to the corresponding moment in the clip's corresponding transcript. A demarcation made to a moment in a transcript gets automatically applied to the corresponding moment in the transcript's corresponding clip. Demarcations can be made manually by the user or automatically by the software system.

In some embodiments, now referring again to FIG. 3, the GUI provides the user with a "playback control setting" 325 that the user can set to read "demarcations only" (or an alternate wording) which will configure playback to skip any moments not demarcated. If the user does not wish to restrict playback to just the demarcated moments, the user can set the playback control setting to read "everything" (or an alternate wording) which will configure playback to play continuously through both the moments that are demarcated and the moments that are not, without skipping.

In some embodiments, now referring again to FIG. 6, user input at the user device can define how similar recurrences must be to instances for the software system to automatically identify recurrences as recurrences of instances. In some embodiments, the GUI provides a "similarity bar" 615 that the user can adjust to set a "similarity threshold" that defines how similar (from 0% similar to 100% similar) recurrences must be to instances for the software system to automatically identify recurrences as recurrences of instances. In some embodiments, the GUI provides the user with a set of "margin control tools and settings" 625 that the user can apply to adjust, individually or collectively, parameters such as the durations of demarcations, the positioning of their in and/or out points, the durations of their margins, and/or the positioning or offset of their margins so that the user can control how much content is demarcated within one or more demarcations and/or how much more (or less) content beyond the identified instances and/or recurrences is demarcated within one or more demarcations. In some embodiments, "apply all checkbox tools" 620 are provided that allow the user to individually or collectively adjust these parameters (and other parameters and/or settings, such as, but not limited to, the similarity bar 615) for one or more demarcations simultaneously.

In some embodiments, now referring again to FIG. 3, the GUI provides a "select tool" 330 for the user to collectively or individually select demarcations. The select tool 330 can be activated by clicking on it. It can then be used by clicking on a demarcation, which encloses the clicked demarcation in a "select outline" 335, indicating that it is currently selected. Clicking on another demarcation while holding the shift key selects the other demarcation in addition to the one already selected. Clicking on another demarcation without holding the shift key selects the other demarcation and unselects the first. Selecting a demarcation (or demarcations) enables the user to adjust the settings and/or parameters for just the selected demarcation (or demarcations). Such settings and/or parameters include, but are not limited to, the durations of demarcations, the positioning of their in and/or out points, the durations of their margins, and/or the positioning or offset of their margins. In some embodiments, now referring again to FIG. 6, the adjustments that the user can make using the margin control tools and settings 625 can alternatively be made using point, click, and drag actions using the select tool 330 at in points 500, out points 505, at a demarcation 320, the dividing line between an in margin 510 and its demarcation 320, and the dividing line between an out margin 515 and its demarcation 320. Such point, click, and drag actions can allow the user to adjust the durations of demarcations, the positioning of their in and/or out points, the durations of their margins, and/or the positioning or offset of their margins.

In some embodiments, the user can direct the software system to automatically identify both instances and recurrences. In some embodiments, the user can direct the software system to automatically identify both instances and recurrences that take place between "action" and "cut". In some embodiments, referring again to FIG. 6, automatic identification of instances and recurrences that take place between "action" and "cut" is possible by setting the detection method setting 610 to read "all lines between action and cut" (or an alternate wording). Demarcations made automatically using the setting "all lines between action and cut" (or an alternate wording) for the detection method setting 610, produces demarcations that take place between utterances of "action" and utterances of "cut". Now referring to FIG. 7A and FIG. 7B, an "action identifier" 710 is automatically placed on instances of the word "action" by the software system and a "cut identifier" 715 is automatically placed on instances of the word "cut" by the software system and the software system automatically demarcates instances and recurrences that take place between them. Now referring again to FIG. 6, when the detection method setting 610 is set to read "all lines between action and cut" (or an alternate wording), a "demarcation anchor setting" 630 is enabled. If the demarcation anchor setting 630 is not enabled, it is set by default to read "first and last lines of dialogue in a take" or "first and last utterances within a demarcation" (or an alternate wording). If the demarcation anchor setting 630 is enabled, it can be set by the user to read "anchor to action and cut" (or an alternate wording). If the demarcation anchor setting 630 is set to read "anchor to action and cut" (or an alternate wording), demarcations made automatically using the setting "all lines between action and cut" for the detection method setting 610 are anchored to an action identifier 710 at the demarcation's in point 500 and a cut identifier 715 at the demarcation's out point 505. Demarcations made with the demarcation anchor setting 630 set to read "anchor to action and cut" are illustrated, now referring individually to FIG. 7B, in a "first action/cut anchoring example" 705. If the demarcation anchor setting 630 (whether it is enabled or not) is set to read "first and last lines of dialogue in a take" or "first and last utterances within a demarcation" (or an alternate wording), demarcations made (with the detection method setting 610 set to any state) are anchored to the first and last utterances within a demarcation or instance demarcation, with the in margin 510 ending as the first utterance begins, and the out margin 515 beginning as the last utterance ends. Demarcations made with the demarcation anchor setting 630 set to read "first and last lines of dialogue in a take" or "first and last utterances within a demarcation" (or an alternate wording) are illustrated, now referring individually to FIG. 7A, in a "first first/last utterance anchoring example" 700. This anchoring method can be used with the detection method setting 610 set to any state, and can be used with or without the identification of utterances of "action" and/or "cut".

Figure 8:
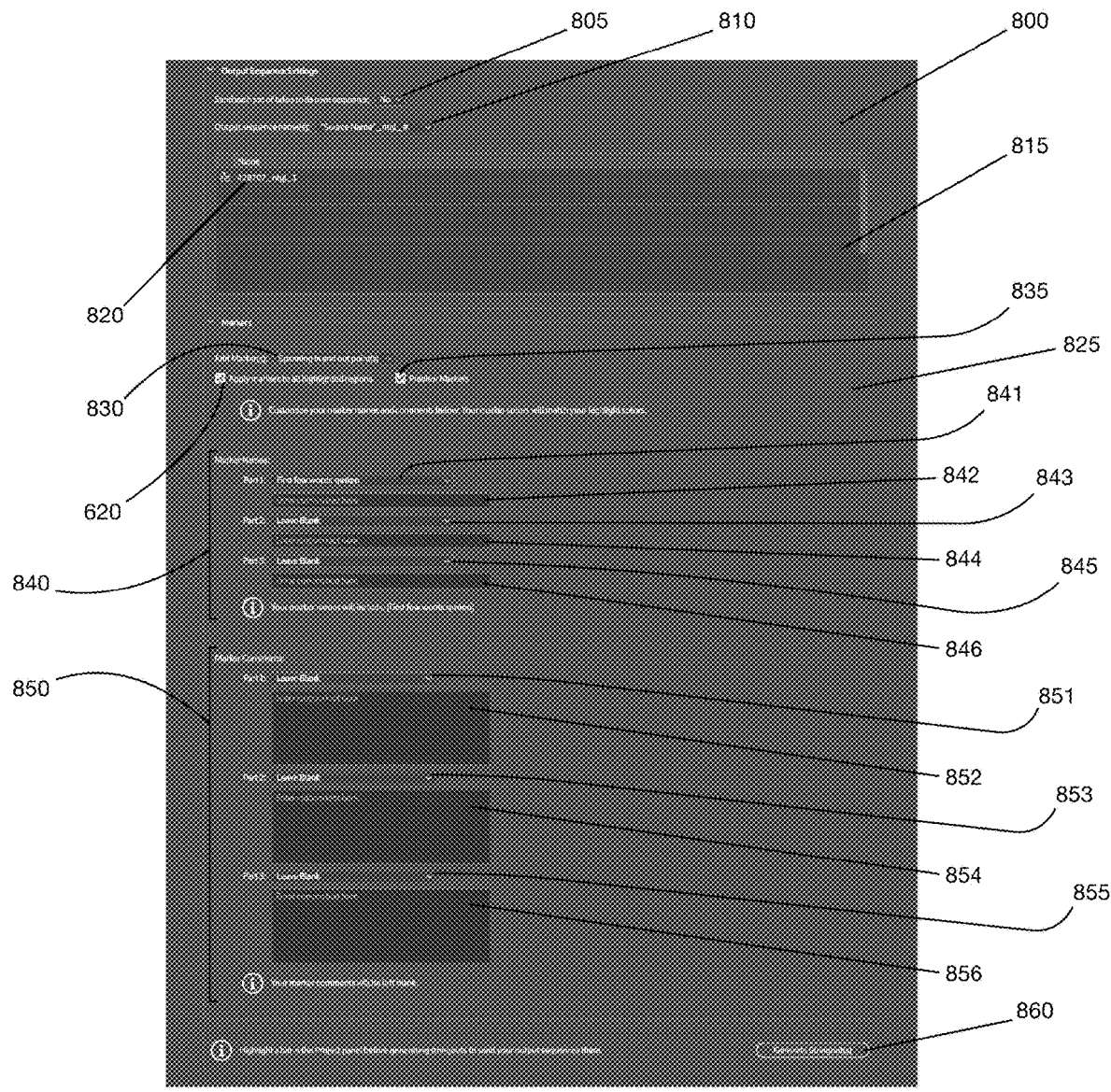
FIG. 8 illustrates output sequence controls and tools and settings contained in it, a marker control section and tools and settings contained in it included in a graphical user interface (GUI) of some embodiments.

In some embodiments, now referring to FIG. 8, user input can direct the software system to automatically organize just the demarcated content into an audio, video, and/or audio/video sequence or a file readable as such, leaving out any content not demarcated. In some embodiments, the user can direct the software system to execute this action by clicking a "generate stringout button" 860. In some embodiments, the GUI provides a set of "output sequence controls" 800 that enable the user to set various parameters for the creation of a sequence (or file readable as such) containing just the demarcated content, which the user may apply before clicking the generate stringout button 860 to customize the exact results. In some embodiments, in the output sequence controls 800, an "output sequence name setting" 810 is provided. In some embodiments, the output sequence name setting 810 can be set by the user to assign the created sequence (or file readable as such) a name that includes the name (or names) of the clip, clips, or sequence of clips that were demarcated to create the sequence (or file readable as such). In some embodiments, naming assignation of this type may be referred to as "source name". In some embodiments, the output sequence name setting 810 can also be set to assign the created sequence (or file readable as such) a name that includes the scene number of the clip, clips, or sequence of clips that were demarcated to create the sequence (or file readable as such). In some embodiments, the output sequence name setting 810 can also be set to assign the created sequence (or file readable as such) a name that includes the first few words spoken in one or more demarcations of the clip, clips, or sequence of clips that were demarcated to create the sequence (or file readable as such). In some embodiments, the output sequence name setting 810 can also be set to assign the created sequence (or file readable as such) a name that includes the last few words spoken in one or more demarcations of the clip, clips, or sequence of clips that were demarcated to create the sequence (or file readable as such). In some embodiments, the output sequence name setting 810 can also be set to assign the created sequence (or file readable as such) a name that includes custom text input by the user. In some embodiments, in the output sequence controls 800, an "output sequence display grid" 815 is provided. The output sequence display grid 815 displays what the output sequence (or sequences) will be named once created. If more than one sequence is being prepared, the output sequence display grid 815 will list/display each sequence. The user can type custom text into a "sequence name field" 820 to assign a custom name to the sequence (or file readable as such). The user can type custom text into any sequence name field 820 for any sequence listed/displayed by the sequence display grid 815.

Figure 7A:
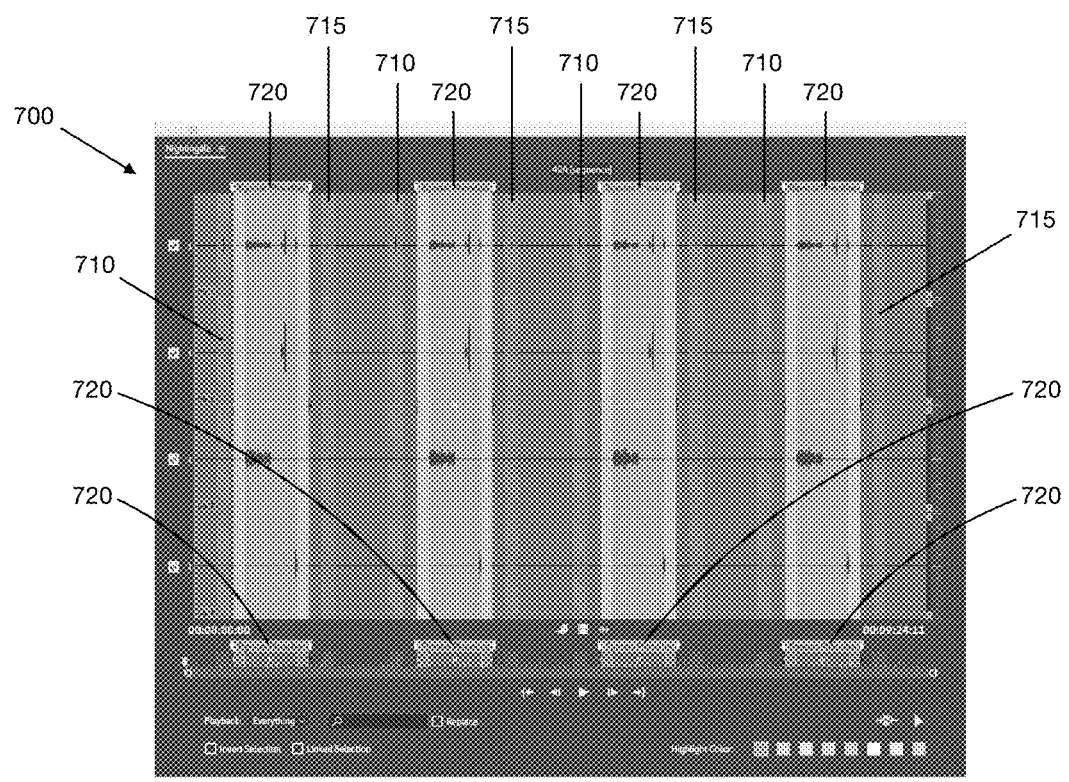
FIG. 7A illustrates the software system's automatic identification of both instances and recurrences that take place between "action" and "cut", preview markers, and demarcations anchored to utterances.
Figure 7B:
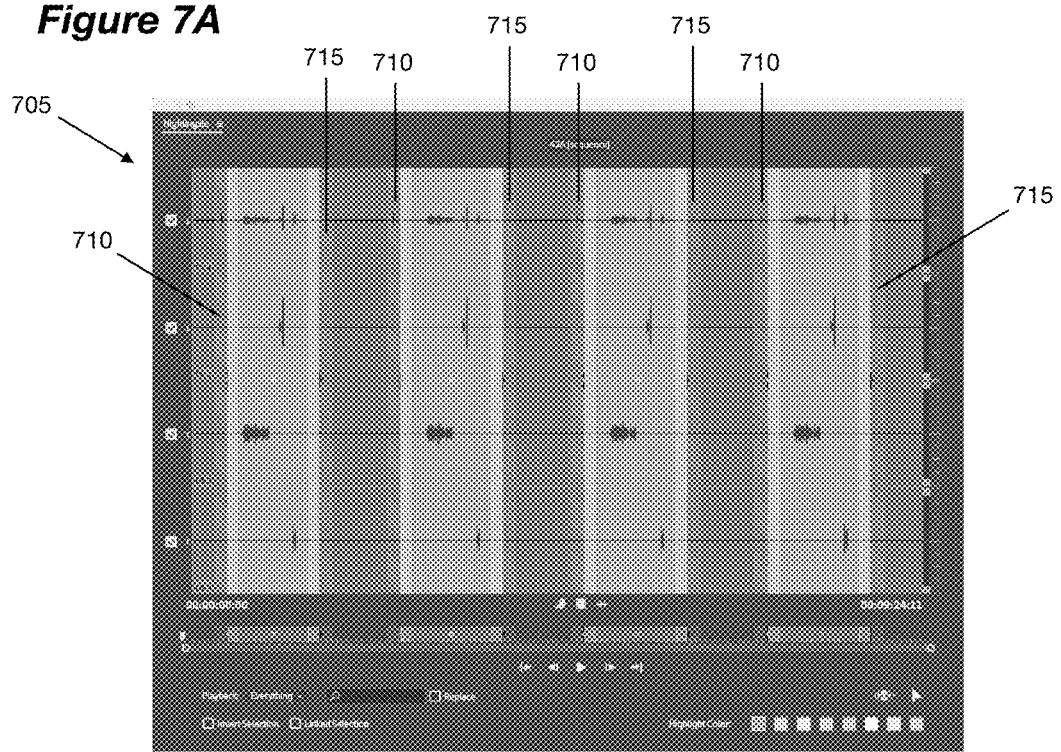
FIG. 7B illustrates the software system's automatic identification of both instances and recurrences that take place between "action" and "cut" and demarcations anchored to "action" and "cut".

In some embodiments, the user can direct the software system to automatically and simultaneously apply categorizations, classifications, labels and/or metadata to clips and/or demarcations and such categorizations, classifications, labels and/or metadata can take the form of text and can be read by audio, video, and/or audio/video editing software as markers containing text, and can be included in the audio, video, and/or audio/video sequences or files readable as such (that the user directs the software system to automatically organize just the demarcated content into). In some embodiments, the GUI provides a "marker control section" 825 that the user can apply to assign categorizations, classifications, labels and/or metadata to markers and assign those markers to demarcations for inclusion in the audio, video, and/or audio/video sequences or files readable as such (that the user directs the software system to automatically organize just the demarcated content into). The user may apply the marker control section 825 before clicking the generate stringout button 860 to customize the exact results of the generate stringout button 860 and/or include markers in that result. In some embodiments, the marker control section 825 provides an "add markers tool" 830 that the user can use to direct the software system to automatically assign markers to demarcations and place them at their in points 500, at their out points 505, or for the duration of demarcations, from in point 500 to out point 505. In some embodiments, the user can set the add markers tool 830 to read "at in point(s)" to place markers at in points 500, or read "at out point(s)" to place markers at out points 505, or read "spanning in and out point(s)" to place markers for the duration of demarcations from in point 500 to out point 505. Markers can be previewed on demarcations in the waveform view 215, the transcript view 225, and the timeline view 235, by checking the "preview markers checkbox" 835. Demarcations with a "preview marker" 720 (as they appear when seen in the waveform view 215 and the timeline view 235 and when the add markers tool 830 is to read "spanning in and out point(s)") are illustrated in FIG. 7A. In some embodiments, referring again to FIG. 8, the marker control section 825 provides a "marker name control section" 840. The user can apply the marker name control section 840 to set the text of marker names. In some embodiments, the text of marker names can be set in three parts to create a whole marker name by setting a "first part marker name control" 841, a "second part marker name control" 843, and/or a "third part marker name control" 845. The first part marker name control 841, the second part marker name control 843, and the third part marker name control 845 can be used in any permutation with each other and any number of them can be excluded from use in the naming process. The first part marker name control 841, the second part marker name control 843, and the third part marker name control 845 can be set independently of each other to assign text to marker names in the following ways: assign text to the marker name that includes the scene number of the clip, clips, or sequence of clips in the marked demarcation, assign text to the marker name that includes the take number of the clip, clips, or sequence of clips in the marked demarcation, assign text to the marker name that includes the number of the marked demarcation relative to its position chronologically with its corresponding instance and/or recurrences, assign text to the marker name that includes the first few words spoken in the marked demarcation, assign text to the marker name that includes the first few words spoken in the marked demarcation's corresponding instance demarcation, assign text to the marker name that includes the last few words spoken in the marked demarcation, assign text to the marker name that includes the last few words spoken in the marked demarcation's corresponding instance demarcation, assign text to the marker name that includes the name (or names) of the clip, clips, or sequence of clips in the marked demarcation, assign no text to the marker name, or assign custom text to the marker name entered by the user. Custom text can be entered by the user for the first part marker name control 841 at a "first custom marker name field" 842. Custom text can be entered by the user for the second part marker name control 843 at a "second custom marker name field" 844. Custom text can be entered by the user for the third part marker name control 845 at a "third custom marker name field" 846.

In some embodiments, referring still to FIG. 8, the marker control section 825 provides a "marker comments control section" 850. The user can apply the marker comments control section 850 to set the text of marker comments. In some embodiments, the text of marker comments can be set in three parts to create a whole marker comment by setting a "first part marker comment control" 851, a "second part marker comment control" 853, and/or a "third part marker comment control" 855. The first part marker comment control 851, the second part marker comment control 853, and the third part marker comment control 855 can be used in any permutation with each other and any number of them can be excluded from use in the commenting process. The first part marker comment control 851, the second part marker comment control 853, and the third part marker comment control 855 can be set independently of each other to assign text to marker comments in the following ways: assign text to the marker comment that includes the first few words spoken in the marked demarcation, assign text to the marker comment that includes the first few words spoken in the marked demarcation's corresponding instance demarcation, assign text to the marker comment that includes the last few words spoken in the marked demarcation, assign text to the marker comment that includes the last few words spoken in the marked demarcation's corresponding instance demarcation, assign text to the marker comment that includes all words spoken in the marked demarcation, assign text to the marker comment that includes all words spoken in the marked demarcation's corresponding instance demarcation, assign no text to the marker comment, or assign custom text to the marker comment entered by the user. Custom text can be entered by the user for the first part marker comment control 851 at a "first custom marker comment field" 852. Custom text can be entered by the user for the second part marker comment control 853 at a "second custom marker comment field" 854. Custom text can be entered by the user for the third part marker comment control 855 at a "third custom marker comment field" 856.

In some embodiments, user input can direct the software system to automatically apply text to markers so that the text includes the file name of one or more clips within the marked demarcation, whether such a clip or clips are partially or wholly within that demarcation. In some embodiments, user input can direct the software system to automatically apply numbers to markers so that markers are numbered in a fashion that counts, in chronological order, the number of times an instance and its recurrences are demarcated. In some embodiments, the software system automatically extrapolates the scene and/or take number from the file name or names of the marked demarcated content. In some embodiments, the software system's automatic extrapolation of the scene and/or take number from a file name or names is done by the system recognizing one or more naming conventions in that file name or names that indicate the scene and/or take number. Other embodiments may extrapolate the scene and/or take number in other ways, and the examples here are included for illustrative purposes only and do not limit the inventive subject matter to a particular embodiment or embodiments.

Figure 9:
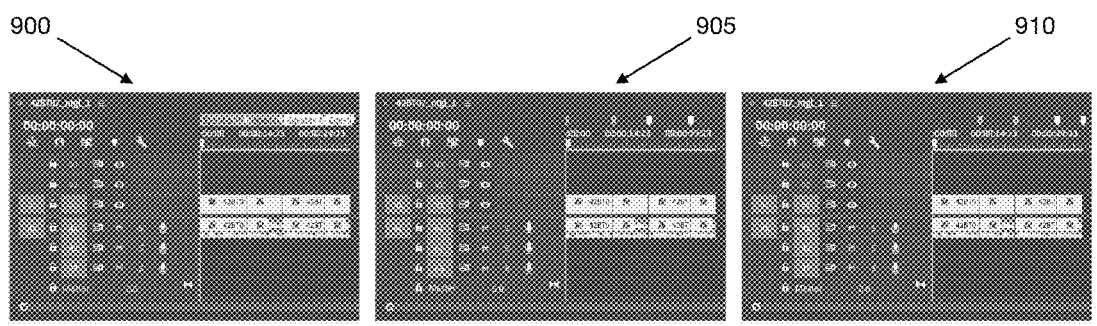
FIG. 9 illustrates example output sequences.

In some embodiments, by clicking the generate stringout button 860, the software system is directed to automatically organize just the demarcated content into an audio, video, and/or audio/video sequence or a file readable as such (or multiple), leaving out any content not demarcated. Such a sequence, or file readable as such (or multiple), may be readable as such by non-linear editing systems and/or audio, video, and/or audio/video editing software. Such a sequence or file readable as such can be displayed by a non-linear editing system's UI stored on (or accessible through) the user device, or part of an embodiment of the inventive subject matter that uses one or another of many possible GUIs. In some embodiments, now referring to FIG. 9, an audio, video, and/or audio/video sequence or a file readable as such (or multiple) with just the demarcated content automatically organized into it, may be displayed as a sequence. A "first example sequence" 900 shows a sequence automatically organized by the software system with just the demarcated content and with markers set for the duration of demarcations, from in point 500 to out point 505. A "second example sequence" 905 shows a sequence automatically organized by the software system with just the demarcated content and with markers set at the in points 500 of demarcations. A "third example sequence" 910 shows a sequence automatically organized by the software system with just the demarcated content and with markers set at the out points 505 of demarcations.

In some embodiments, now referring again to FIG. 5, the GUI provides a "panel of grouping tools" 520 that the user can apply to group demarcations. In some embodiments, the panel of grouping tools 520 can be used to group demarcations by assigning group colors to one or more demarcations. Group colors can be assigned by the user to one or more demarcations by first using the select tool 330 to select a demarcation or demarcations, then selecting a color from the panel of grouping tools 520. Groups can be defined manually by the user and/or automatically defined by the software system. In some embodiments, the software system can automatically define a group as a set of demarcations that include a demarcation of an instance and one or more demarcations of that instance's recurrences, leaving out demarcations of other instances and other recurrences, which can likewise be grouped automatically by the software system into their own groups, each group containing a demarcation of an instance and one or more demarcations of that instance's recurrences. Group colors can be assigned manually by the user and/or automatically assigned by the software system. In some embodiments, groups are made automatically by the software system and group colors are assigned automatically by the software system when the detection method setting 610 is set to read "all lines between action and cut" (or an alternate wording). FIG. 5 depicts four demarcations that have been divided into two groups, each group having been assigned a group color. In some embodiments, a "linked selection setting" 525 is provided that the user can activate to set the select tool 330 to automatically select an entire group of demarcations when one demarcation within that group is selected. In some embodiments, an "invert selection setting" 530 is provided that the user can activate to invert what content is and is not demarcated such that any content that was demarcated (before its activation) becomes not demarcated, and any content that was not demarcated (before its activation) becomes demarcated. In some embodiments, markers in audio, video, and/or audio/video sequences or a files readable as such are automatically set by the software system to match the group color to which they correspond.

In some embodiments, now referring again to FIG. 8, the GUI provides an "output groups to separate sequences setting" 805 that the user can set to read "yes" to enable the user to direct the software system to automatically organize each group of demarcations into to its own audio, video, and/or audio/video sequence or file readable as such. In some embodiments, the output groups to separate sequences setting 805 set to read "yes" enables the user to prepare multiple sequences at the same time and enables the output sequence display grid 815 to display multiple sequences. The user can apply the output sequence controls 800 (and all the tools and settings contained within it) to set the various parameters for the creation of multiple sequences (or files readable as such) containing just the demarcated content (and/or with each group of demarcations organized into to its own sequence), and apply the marker control section 825 to assign categorizations, classifications, labels and/or metadata to markers and assign those markers to demarcations for inclusion in the multiple audio, video, and/or audio/video sequences or files readable as such (that the user directs the software system to automatically organize just the demarcated content into and/or with each group of demarcations organized into to its own sequence) before clicking the generate stringout button 860 to customize the exact results. When the output groups to separate sequences setting 805 is set to read "no", groups are organized into the same sequence.

In some embodiments, now referring again to FIG. 3, the GUI provides a "linked selection setting" 340 for the user to enable the select tool 330 to, when used, select groups of demarcations by clicking on one demarcation within a group, which encloses each demarcation within the selected group in its own select outline 335, indicating that the group is currently selected. Clicking on another demarcation within another group while holding the shift key selects the other demarcations within the other group in addition to the group already selected. Clicking on another demarcation within another group without holding the shift key selects the other demarcations within the other group and unselects the first. Selecting a group of demarcations (or groups of demarcations) enables the user to adjust the settings and/or parameters of the specific group of demarcations (or groups of demarcations) selected. Such settings and/or parameters include, but are not limited to, the durations of demarcations, the positioning of their in and/or out points, the durations of their margins, and/or the positioning or offset of their margins.

Figure 10:
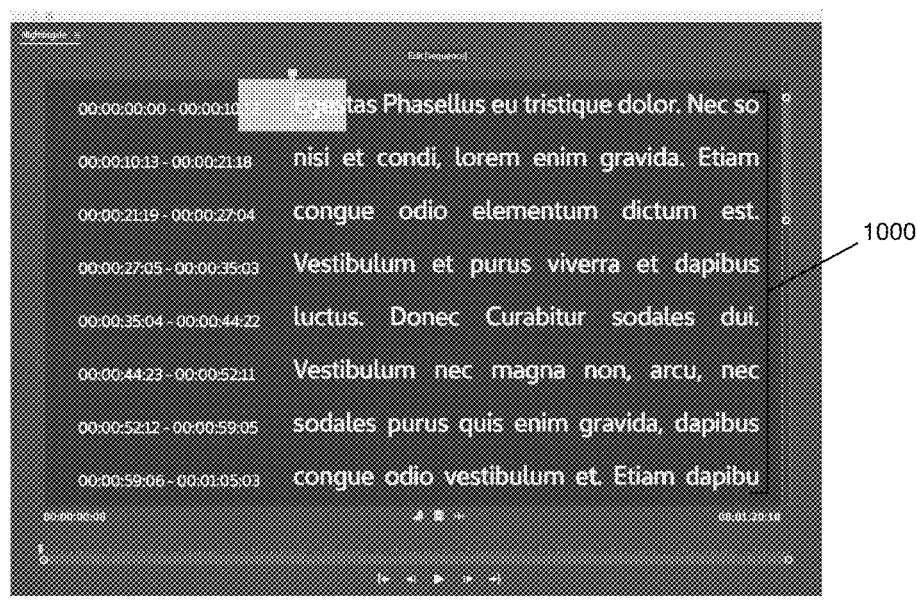
FIG. 10 illustrates an amalgamated transcript.
Figure 11:
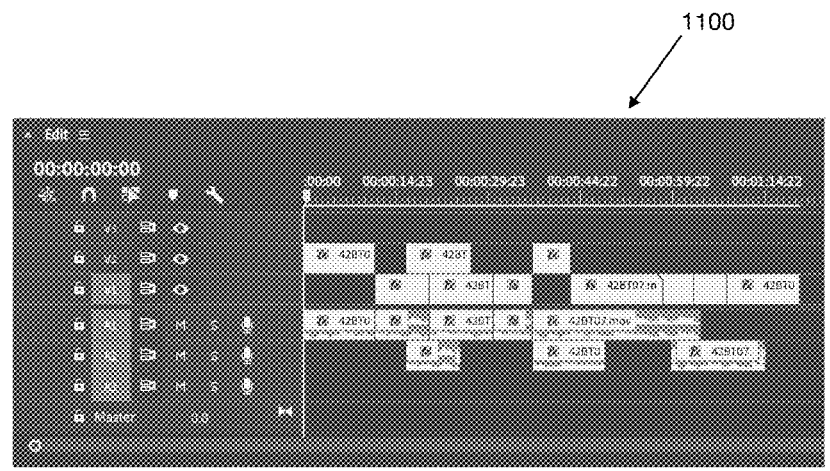
FIG. 11 illustrates an example sequence containing one or more clips in a particular arrangement, amalgamation, duplication, division, and/or trimming.
Figure 17:
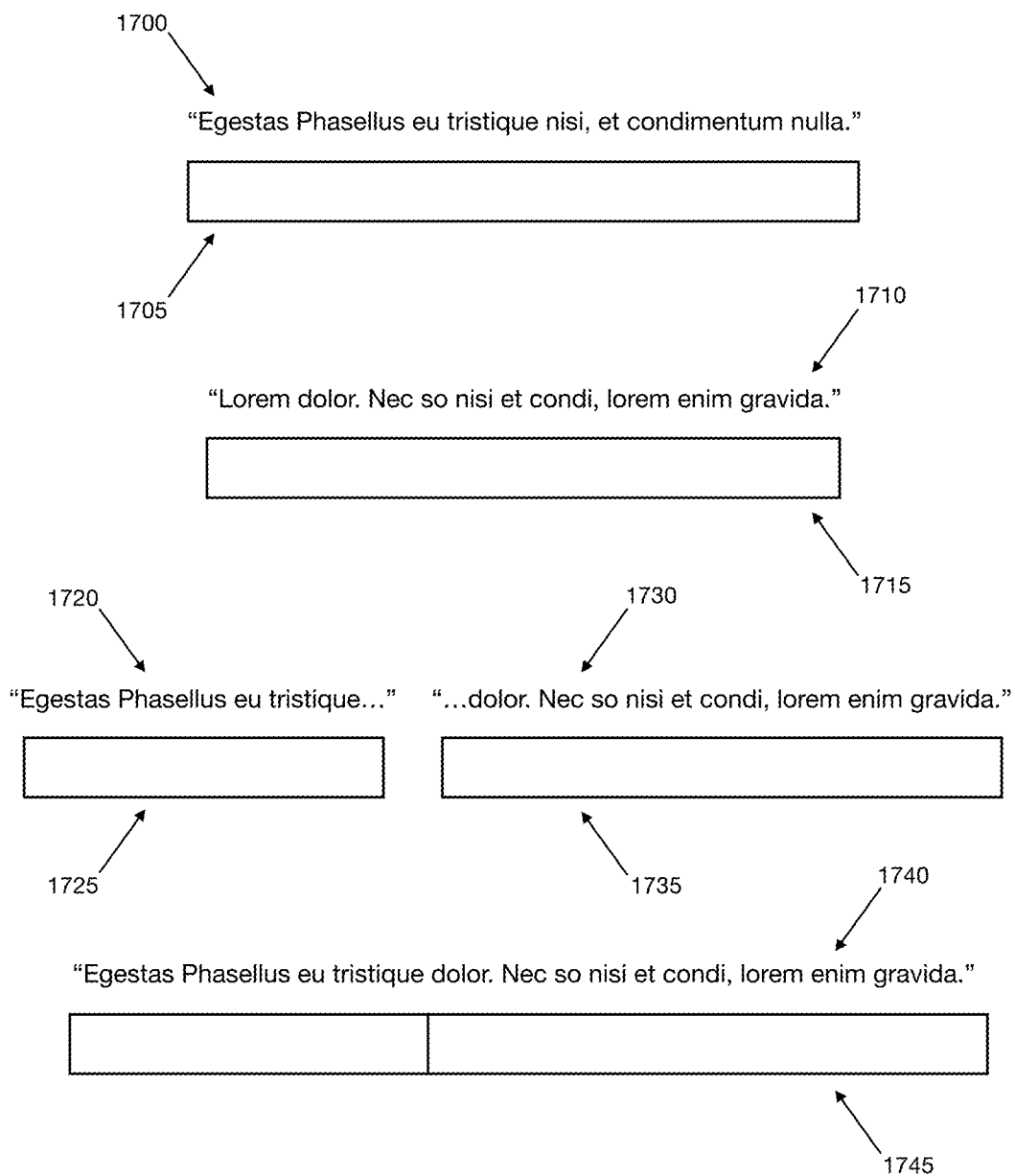
FIG. 17 conceptually illustrates the process of the creation of an amalgamated transcript.

In some embodiments, the transcript view 225 can, now referring to FIG. 10, display transcripts in an "amalgamated transcript mode" 1000. The amalgamated transcript mode 1000 is activated automatically when the view frame 200 is displaying a sequence of one or more clips that correspond to one or more transcripts. Now referring to FIG. 11, a "first example of a sequence of one or more clips" 1100 is shown. A sequence such as the one depicted in the first example of a sequence of one or more clips 1100 can activate the amalgamated transcript mode 1000 when displayed in the view frame 200. In the amalgamated transcript mode 1000, the transcript view 225 displays the transcript or transcripts that correspond to the one or more clips in the displayed sequence in a mode that arranges, amalgamates, duplicates, divides, and/or trims the transcript or transcripts to match the arrangement, amalgamation, duplication, division, and/or trimming of their corresponding clip or clips in the sequence displayed. A transcript or transcripts displayed in the amalgamated transcript mode 1000 appear in the transcript view 225 as one transcript and may be referred to as an "amalgamated transcript". Referring again to FIG. 11, the clip or clips in the first example of a sequence of one or more clips 1100 have been arranged, amalgamated, duplicated, divided, and/or trimmed in a specific way. Other arrangements, amalgamations, duplications, divisions, and/or trimmings are possible. In some embodiments, when the view frame 200 is displaying a sequence of one or more clips that correspond to one or more transcripts, the export transcript section 390 can be applied by the user to export amalgamated transcripts into one or more printable and/or editable document formats by clicking the export transcript button 395. The user can choose the format an amalgamated transcript is exported to by using the export transcript format selection tool 396. Now referring to FIG. 17, FIG. 17 illustrates the software system's creation of an amalgamated transcript. A "first example transcript" 1700 is shown. A "first example clip" 1705 is shown. The first example transcript 1700 corresponds to the first example clip 1705. A "second example transcript" 1710 is shown. A "second example clip" 1715 is shown. The second example transcript 1710 corresponds to the second example clip 1715. A "trimmed first example transcript" 1720 is shown and illustrates a trimmed version of the first example transcript 1700. A "trimmed first example clip" 1725 is shown and illustrates a trimmed version of the first example clip 1705. A "trimmed second example transcript" 1730 is shown and illustrates a trimmed version of the second example transcript 1710. A "trimmed second example clip" 1735 is shown and illustrates a trimmed version of the second example clip 1715. An "amalgamated transcript example" 1740 is shown. A "sequence of clips example" 1745 is shown. The amalgamated transcript example 1740 corresponds to the sequence of clips example 1745. The arrangement, amalgamation, duplication, division, and/or trimming of the transcripts in the amalgamated transcript example 1740 matches the arrangement, amalgamation, duplication, division, and/or trimming of the clips in the sequence of clips example 1745. In some embodiments, timecode data is used to arrange, amalgamate, duplicate, divide, and/or trim transcripts to match their corresponding clips.

Figure 12:
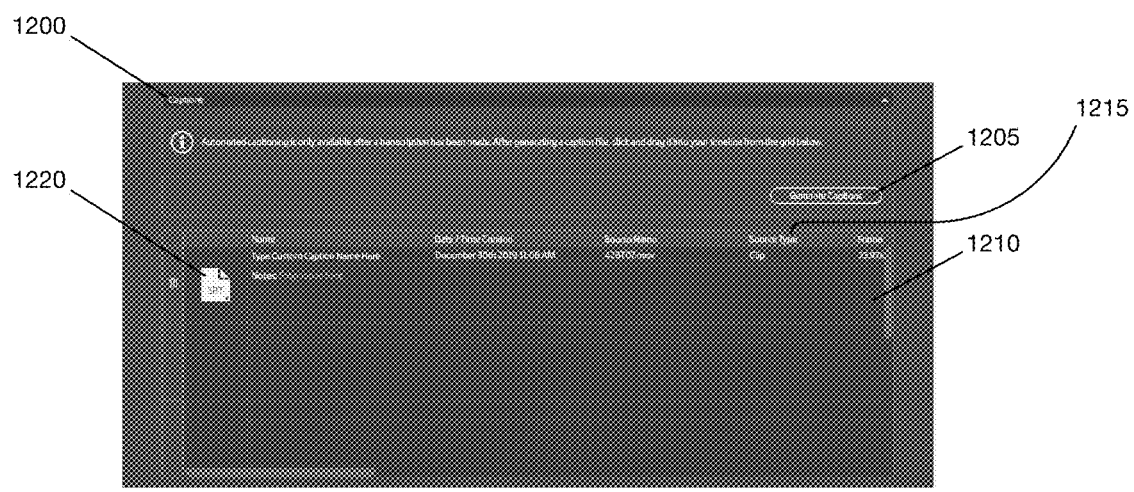
FIG. 12 illustrates a captions section and tools and settings contained in it included in a graphical user interface (GUI) of some embodiments.
Figure 13:
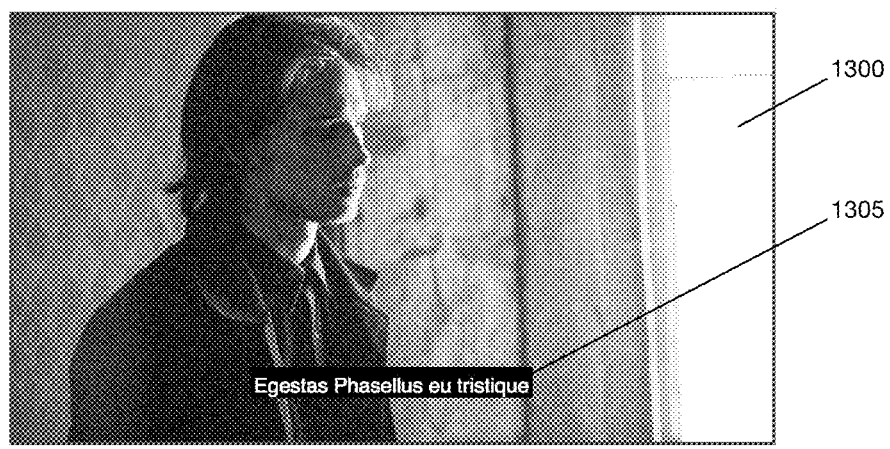
FIG. 13 illustrates a video display of a subtitle/caption file.
Figure 14:
FIG. 14 illustrates additional example sequences that have subtitle/captions files contained within them.

In some embodiments, now referring to FIG. 12, a "captions section" 1200 is provided. In the captions section 1200, a "generate captions button" 1205 is provided. The generate captions button 1205 can be clicked by the user to direct the software system to automatically generate a subtitle/caption file (or files) from a transcript, transcripts (or portions of one or more transcripts), or amalgamated transcript that correspond to a user selected clip, clips (or portions of one or more clips), or sequence of clips (a sequence of clips being analogous to, or corresponding to, an amalgamated transcript). Such subtitle/caption files feature the text of the transcript, transcripts (or portions of one or more transcripts), or amalgamated transcript from which they were generated, and are in time-sync with the user-selected clip, clips (or portions of one or more clips), or sequence of clips that correspond to those transcripts (or amalgamated transcript). In some embodiments, a "caption display grid" 1210 is provided that lists and/or visualizes for the user how many subtitle/caption files have been created from a selected clip, clips, or sequence of clips. The caption display grid 1210 indicates whether a subtitle/caption file was created from a clip or a sequence within a "source type column" 1215. In some embodiments, if a subtitle/caption file was created from a clip, the source type column 1215 will read "clip", and if a subtitle/caption file was created from a sequence (analogous to an amalgamated transcript), the source type column 1215 will read "sequence". In some embodiments, a "caption icon" 1220 is provided that the user can click and drag into a sequence to add the subtitle/caption file to that sequence. Now referring to FIG. 14, a "first example of a dragged caption icon" 1405 is shown in a "fourth example sequence" 1400. The "first example of a dragged caption icon" 1405 shows a subtitle/caption file created from a clip (using its corresponding transcript). Now referring to FIG. 13, FIG. 13 shows a "video display" 1300 with a "video display of a subtitle/caption file" 1305. In some embodiments, the video display 1300 and the video display of a subtitle/caption file 1305 may be part of the user device UI, part of a non-linear editing system's UI stored on (or accessible through) the user device, or part of an embodiment of the inventive subject matter that uses one or another of many possible GUIs. Subtitle/caption files are in time-sync with the clip, clips, and/or sequence of clips from which they were made (using their corresponding transcript, transcripts, or amalgamated transcripts), and can be played back in time-sync with the clip, clips, and/or sequence of clips from which they were made. Now referring again to FIG. 14, a "second example of a dragged caption icon" 1415 is shown in a "fifth example sequence" 1410. The "second example of a dragged caption icon" 1415 shows a subtitle/caption file created from a sequence (or amalgamated transcript).

Figure 15:
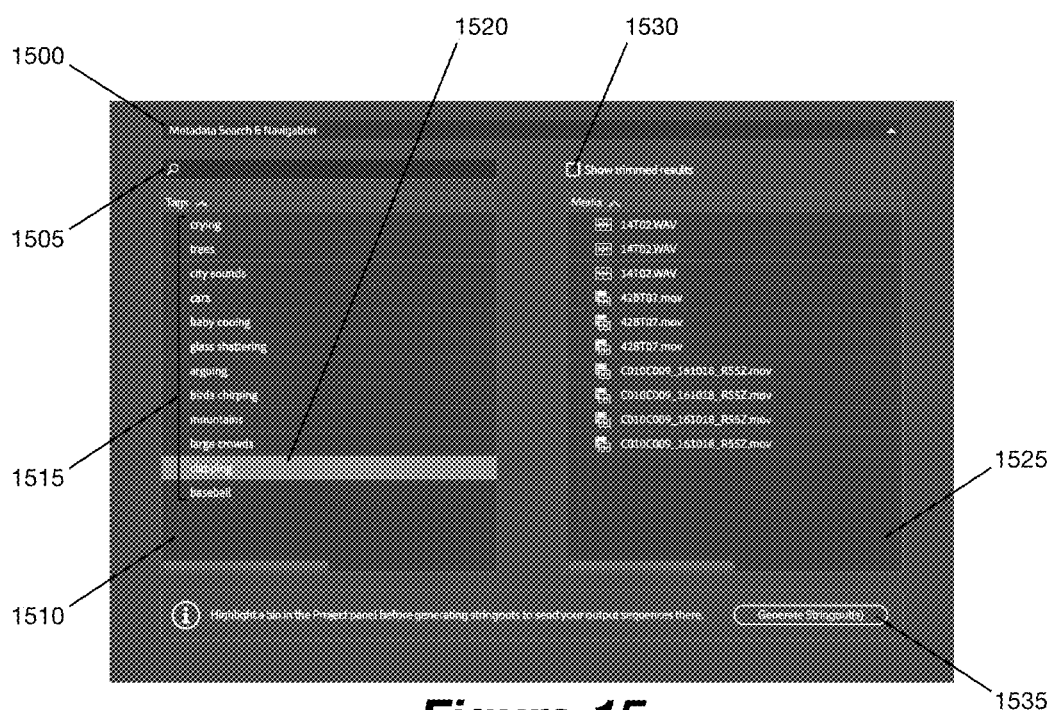
FIG. 15 illustrates a metadata search and navigation section and tools and settings contained in it included in a graphical user interface (GUI) of some embodiments.

In some embodiments, now referring to FIG. 15, the GUI provides a "metadata search and navigation section" 1500. The metadata search and navigation section 1500 provides a "metadata search tool" 1505 that the user can enter text into as search parameters to find metadata that is the same or similar to the search parameters entered. A "metadata display grid" 1510 is provided that lists/displays metadata thus far produced by the software system. Metadata can take the form of keywords, tags, labels, phrases, sentences, and/or other text. Entering search parameters into the metadata search tool 1505 narrows the list of metadata displayed in the metadata display grid 1510 to metadata that is the same or similar to the search parameters entered. One or more "metadata items" 1515 listed/displayed in the metadata display grid 1510 can be selected by the user by clicking on it. An "example metadata item selection" 1520 is shown. When a user selects one or more metadata items 1515, a "media display grid" 1525 is populated with and lists/displays all clips that correspond to the one or more selected metadata items 1515. A "show trimmed results checkbox" 1530 is provided that the user can check to reformat the media display grid 1525 to list/display the individual portions of clips (or specific spans of time within clips) that correspond to the one or more selected "metadata items" 1515. With the show trimmed results checkbox 1530 checked, the media display grid 1525 can display a clip and its name more than once to indicate that such a clip contains multiple portions (or multiple spans of time) that correspond to the one or more selected "metadata items" 1515. A "generate metadata stringout button" 1535 is provided that the user can click to direct the software system to automatically organize the clips or portions of clips (or specific spans of time within clips) listed/displayed in the media display grid 1525 to an audio, video, and/or audio/video sequence or a file readable as such. In some embodiments, one or more clips or portions of clips (or specific spans of time within clips) listed/displayed in the media display grid 1525 can be clicked and dragged into an audio, video, and/or audio/video sequence by the user. In some embodiments, metadata can be produced automatically by the software system from the speech-to-text AI analysis (or analyses) that generates a transcript or transcripts and/or from the transcript or transcripts generated. In some embodiments, metadata can be produced by the software system by applying the file name (or file names) of a clip or clips. In some embodiments, metadata can be produced by the software system by applying optical character recognition, image recognition, computer vision, and/or sound recognition. Other embodiments may create, apply, and/or present metadata in other ways, and the examples here are included for illustrative purposes only and do not limit the inventive subject matter to a particular embodiment or embodiments.

Figure 18:
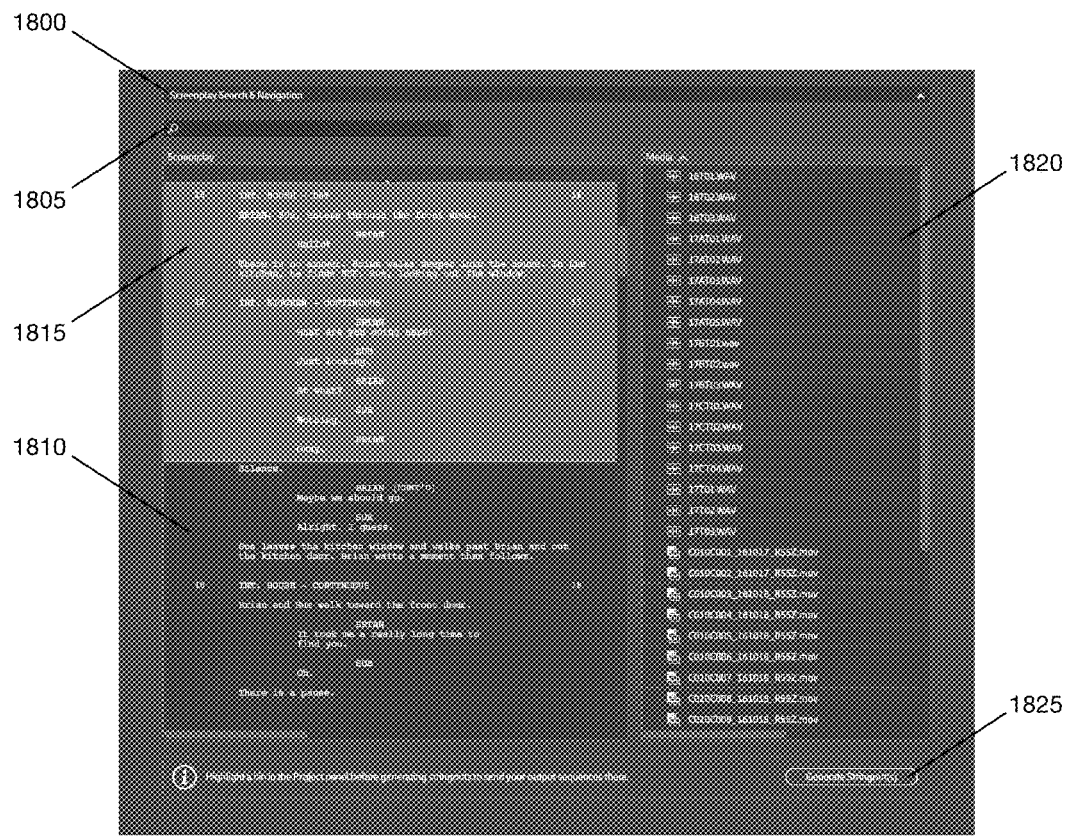
FIG. 18 illustrates a screenplay search and navigation section and tools and settings contained in it included in a graphical user interface (GUI) of some embodiments.

In some embodiments, now referring to FIG. 18, a "screenplay search and navigation section" 1800 is provided. A "screenplay display area" 1810 is provided that the user can load a screenplay into for display in the screenplay display area 1810. In some embodiments, the user may drag and drop a screenplay into the screenplay display area 1810 to load it. The screenplay may be in (but is not limited to) a file format such as a DOC, PDF, FDR, or other, and may be stored on or accessible through the user device prior to loading. A "screenplay search field" 1805 is provided that the user can use to enter search parameters into to search the screenplay. Using the demarcating tool 315, the user can demarcate a section or sections of the screenplay with a "screenplay demarcation" 1815. When a screenplay demarcation 1815 is made, a "screenplay media display grid" 1820 is populated with and lists/displays all portions of clips (or specific spans of time within clips) that correspond to the section or sections demarcated in the loaded screenplay. The screenplay media display grid 1820 can display a clip and its name more than once to indicate that such a clip contains multiple portions (or multiple spans of time) that correspond to the one or more sections demarcated in the loaded screenplay. A "generate screenplay stringout button" 1825 is provided that the user can click to direct the software system to automatically organize the portions of clips (or specific spans of time within clips) listed/displayed in the screenplay media display grid 1820 to an audio, video, and/or audio/video sequence or a file readable as such. In some embodiments, one or more portions of clips (or specific spans of time within clips) listed/displayed in the screenplay media display grid 1820 can be clicked and dragged into an audio, video, and/or audio/video sequence by the user.

Figure 16:
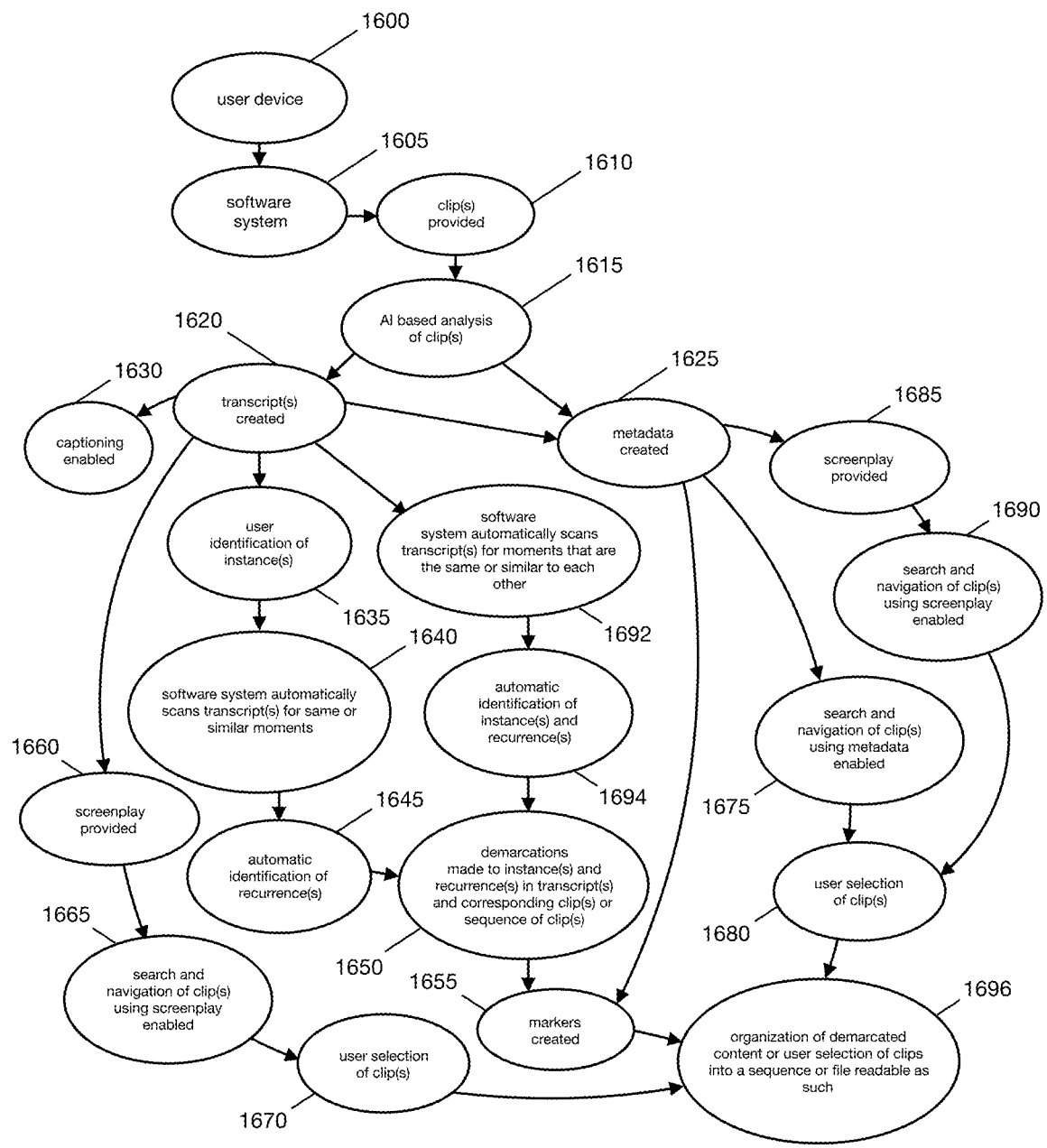
FIG. 16 conceptually illustrates the process and operations of the automated software system.

The software system, its steps, processes, operations, et cetera, are illustrated in FIG. 16 as a flow chart that broadly summarizes one possible embodiment. The flow chart is meant for illustrative purposes only and its depiction is not meant to limit the scope of the invention and the various ways it may be embodied. The software system is stored on a non-transitory machine readable medium such as a multi-purpose computer or personal computer (or "user device"). In some embodiments, a user will begin with a user device and then install the software system onto the user device. FIG. 16 illustrates a "conceptual representation of a user device" 1600 and a "conceptual representation of the software system" 1605. The user device (illustrated as the conceptual representation of a user device 1600) stores the software system (illustrated as the conceptual representation of the software system 1605). The user then provides the software system with a clip or clips that are stored on or accessible through the user device. FIG. 16 illustrates a "conceptual representation of provision of a clip or clips" 1610. Once a clip or clips are provided, the software system can analyze the clip or clips. FIG. 16 illustrates a "conceptual representation of the analysis of a clip or clips" 1615. From that analysis, the software system can automatically create a transcript or transcripts for the analyzed clip or clips. FIG. 16 illustrates a "conceptual representation of the creation of a transcript or transcripts" 1620. In parallel with the creation of a transcript or transcripts, the software system can also produce metadata as a result of the analysis. FIG. 16 illustrates a "conceptual representation of the creation of metadata" 1625. Metadata can be created from the AI based analysis of clip(s) (illustrated as the conceptual representation of the analysis of a clip or clips 1615) and/or from the transcripts produced by AI based analysis (illustrated as the conceptual representation of the creation of a transcript or transcripts 1620). Metadata may also be created by other means. The creation of a transcript or transcripts (illustrated as the conceptual representation of the creation of a transcript or transcripts 1620) enables the software system to automatically generate captions. FIG. 16 illustrates a "conceptual representation of enabled captioning" 1630. Captioning is possible at any point in the flow chart following the creation of transcripts. The conceptual representation of enabled captioning 1630 is only shown where it is to illustrate when in the chart captioning first becomes enabled. The creation of a transcript or transcripts (illustrated as the conceptual representation of the creation of a transcript or transcripts 1620) enables user identification of an instance or instances to instruct the software system to automatically scan for same or similar moments within a transcript or transcripts and their corresponding clip or clips to automatically identify recurrences of the user identified instance or instances. FIG. 16 illustrates a "conceptual representation of user identification of instance(s)" 1635, a "conceptual representation of the software system scanning for same or similar moments" 1640, and a "conceptual representation of the software system automatically identifying recurrence(s)" 1645. The creation of a transcript or transcripts (illustrated as the conceptual representation of the creation of a transcript or transcripts 1620) also enables (alternatively to, independently of, and/or in parallel with the path consisting of the conceptual representation of user identification of instance(s) 1635, conceptual representation of the software system scanning for same or similar moments 1640, and conceptual representation of the software system automatically identifying recurrence(s) 1645) the software system to automatically scan for moments that are the same or similar to each other within a transcript or transcripts and their corresponding clip or clips or the software system to automatically scan for moments that are the same or similar to each other within a transcript or transcripts and their corresponding clip or clips that take place between utterances of "action" and utterances of "cut" to automatically identify instance(s) and recurrence(s). FIG. 16 illustrates a "conceptual representation of automatic scanning for moments that are the same or similar to each other" 1692 and a "conceptual representation of automatic identification of instance(s) and recurrence(s)" 1694. The path from the conceptual representation of the creation of a transcript or transcripts 1620 consisting of the conceptual representation of user identification of instance(s) 1635, conceptual representation of the software system scanning for same or similar moments 1640, and conceptual representation of the software system automatically identifying recurrence(s) 1645 can run alternatively to, independently of, and/or in parallel with the path from the conceptual representation of the creation of a transcript or transcripts 1620 consisting of the conceptual representation of automatic scanning for moments that are the same or similar to each other 1692 and the conceptual representation of automatic identification of instance(s) and recurrence(s) 1694. Both paths can lead independently of each other to the demarcation of instance(s) and recurrence(s). FIG. 16 illustrates a "conceptual representation of the demarcation of instance(s) and recurrence(s)" 1650. From the conceptual representation of the demarcation of instance(s) and recurrence(s) 1650, optionally, markers may be created. FIG. 16 illustrates a "conceptual representation of marker creation" 1655. After demarcations are made (illustrated as the conceptual representation of the demarcation of instance(s) and recurrence(s) 1650), or, if markers were created, after the creation of markers (illustrated as the conceptual representation of marker creation 1655), the demarcated content can be organized into an audio, video, and/or audio/video sequence or file readable as such. FIG. 16 illustrates a "conceptual representation of organized content" 1696. If desired, the user may skip the marker creation step (illustrated as the conceptual representation of marker creation 1655). Multiple independent, alternative, and/or parallel paths can lead to organized content (illustrated as the conceptual representation of organized content 1696). For example, another possible path is from the conceptual representation of the creation of metadata 1625 (following the conceptual representation of the analysis of a clip or clips 1615, and either following or bypassing the conceptual representation of the creation of a transcript or transcripts 1620) and includes the search and navigation of clip(s) using metadata (illustrated as a "conceptual representation of metadata search and navigation of clip(s)" 1675). The search and navigation of clip(s) using metadata is enabled by the creation of metadata (illustrated as the conceptual representation of the creation of metadata 1625). Metadata can be created from the AI based analysis of clip(s) (illustrated as the conceptual representation of the analysis of a clip or clips 1615) and/or from the transcripts produced by AI based analysis (illustrated as the conceptual representation of the creation of a transcript or transcripts 1620). Metadata may also be created by other means. The search and navigation of clip(s) using metadata (illustrated as the conceptual representation of metadata search and navigation of clip(s) 1675) enables the user to make a selection of clips or portions of clips that correspond to selected metadata and organize those selections into an audio, video, and/or audio/video sequence or file readable as such. FIG. 16 illustrates a "conceptual representation of user selection of clip(s)" 1680 that leads to the conceptual representation of organized content 1696. Another possible path is also from the conceptual representation of the creation of metadata 1625 and includes the user provision of a screenplay following the conceptual representation of the creation of metadata 1625. FIG. 16 illustrates a "conceptual representation of user provision of a screenplay" 1685. The user provision of a screenplay enables the search and navigation of clip(s) using the provided screenplay. FIG. 16 illustrates a "conceptual representation of search and navigation of clip(s) using screenplay" 1690. The conceptual representation of search and navigation of clip(s) using screenplay 1690 can lead (alternatively to, in parallel with, or independently of, the path consisting of the conceptual representation of metadata search and navigation of clip(s) 1675) to the user selection of clip(s) (illustrated as the conceptual representation of user selection of clip(s) 1680) and the organization of content (illustrated as the conceptual representation of organized content 1696). Another possible path is from the conceptual representation of the creation of a transcript or transcripts 1620 and is an alternate path for user provision of a screenplay that is not dependent on metadata creation (illustrated as the conceptual representation of the creation of metadata 1625). FIG. 16 illustrates an "alternate conceptual representation of user provision of a screenplay" 1660, an "alternate conceptual representation of search and navigation of clip(s) using screenplay" 1665, and an "alternate conceptual representation of user selection of clip(s)" 1670. The alternate conceptual representation of user selection of clip(s) 1670 then leads to the conceptual representation of organized content 1696. Other paths, operations, steps, processes, et cetera, including those that may not be illustrated in FIG. 16, are possible.

Metadata may take the form of XML files or another file format or formats. Files readable as audio, video, and/or audio/video sequences may take the form of XML files, EDL files, or another file format or formats. Caption files may take the form of SRT files or another file format or formats. Transcripts may take the form of a custom file format or a more common or standard format. Other data used by or produced by the software system may be in a variety of formats either custom, common, standard, or other.

Figure 19:
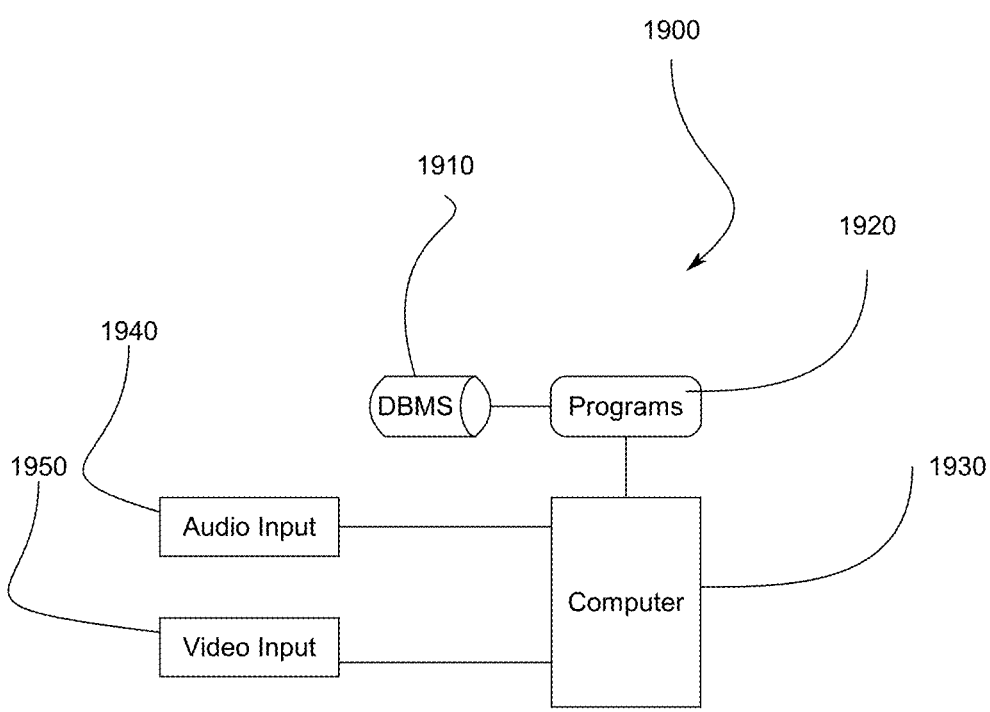
FIG. 19 illustrates a hardware block diagram of one implementation of the system in computerized hardware.

Now referring to FIG. 19, FIG. 19 illustrates a hardware block diagram 1900 of one implementation of the system in computerized hardware. A computer 1930 is a general purpose processor with memory, a processing unit, and peripherals, such as audio input devices 1940 and video input devices 1950, that allow the operation of programs 1920 which store information in a database management system (DBMS) 1910. While this system that is illustrated shows a single processor, those skilled in the arts will understand that the computer can be implemented on a single desktop computer, or that the programs 1920 may operate on the internet in the form of a "cloud-based" computer. The programs 1920 may also operate in the form of "software as a service" (SaaS). These programs can also be constructed so that any number of users may make simultaneous edits to the system. Further computer peripherals, like audio input devices 1940 or video input devices 1950 can be directly connected to the computer 1930 or may be connected via interface devices to cloud-based computers. Collections of information that are generated by the software may be organized in the database management system (DBMS) 1910 for ease of organization and retrieval.

Some embodiments include electronic components, such as, but not limited to, microprocessors, storage, and memory that store computer program instructions in a machine-readable or computer readable medium (alternatively referred to as computer-readable storage media, machine-readable media, or machine readable media). Some embodiments include a non-transitory machine readable medium such as a multi-purpose computer, personal computer, tablet, smart phone, or "user device". A user device may include a mouse (or analogous hardware), a display monitor or monitors, keyboard, audio monitors or speakers, and/or other multi-purpose computer or personal computer components, peripherals, or accessories. The terms "computer readable medium", "computer readable media", and "machine readable medium" refer to tangible, physical objects that store information in a form that is readable by a computer.

While the inventive subject matter has been described with reference to numerous specific details, the invention can be embodied in other forms without departing from the spirit of the invention. In addition, a number of figures (including FIG. 16 and FIG. 17) conceptually illustrate processes. The specific operations of these processes may or may not be performed in the exact order shown and described. The specific operations may or may not be performed in one continuous series of operations, and different specific operations may be performed in different embodiments. Furthermore, the process could be implemented using several sub-processes, or as part of a larger process. Thus, one of ordinary skill in the art would understand that the invention is not to be limited by the foregoing illustrative details, but rather is to be defined by the appended claims.

We claim:

1. A non-transitory machine readable medium storing a software system that automatically logs, organizes, and transcribes audio and video content comprising:

an interactive graphical user interface that is displayed on a monitor to enable user input;

a software component that applies speech-to-text AI to analyze one or more audio and/or audio/video clips;

another software component that applies the results of said analysis or analyses performed by said AI and uses those results to;

create a transcript or transcripts of the audio portions of said clip or clips that underwent analysis that are time-synced with the clip or clips to which they correspond and can be played back in sync and with simultaneity with said corresponding clip or clips;

another software component that can automatically identify instances and recurrences of events in said transcript or transcripts and thereby automatically identify instances and recurrences of events in their corresponding clip or clips to;

enable automated logging and/or organizing of said clip or clips according to criteria determined by user input;

wherein instances and recurrences of events may include, but are not limited to, an utterance, utterances, a word, words, phrases, a letter, letters, dialogue, subjects, topics, and/or text;

wherein user input can identify an instance or instances, and the software system can automatically identify recurrences of said instance or instances;

wherein individual instances and individual recurrences can be individually demarcated with an in and out point;

wherein in and out points can be placed in said transcript or transcripts and said corresponding clip, clips, or a sequence of corresponding clips at corresponding moments;

wherein said in and out points can be applied automatically by the software system;

wherein more than one set of in and out points can co-exist simultaneously across a transcript, transcripts, clip, clips, or a sequence of clips;

wherein said in and out points can enable user input to configure playback of said clip or clips or sequence of clips and their corresponding transcript or transcripts to automatically skip any content not demarcated between an in and an out point;

wherein a file or files readable by audio, video, and/or audio/video editing software as audio, video, and/or audio/video sequences can be generated automatically;

wherein said file or files can be configured by user input to contain just the content that is demarcated between an in and an out point.

2. The system of claim 1 wherein said software component that applies speech-to-text AI to analyze one or more audio and/or audio/video clips can be configured by user input to restrict analysis to one or more specific audio tracks contained within the audio portions of said clip or clips.

3. The system of claim 1 wherein user input can restrict transcription of one or more audio and/or audio/video clips to one or more specific sections of a clip, clips, or sequence of clips.

4. The system of claim 1 wherein the text of said transcript or transcripts can be edited, revised, and/or modified by user input.

5. The system of claim 1 wherein multiple transcripts can correspond to one clip;
 wherein user input can define which of said multiple transcripts is displayed for any one clip.

6. The system of claim 1 wherein said transcript or transcripts can be configured by user input to include or exclude designations for individual speakers;
 wherein designations can be automatically applied and/or defined by user input.

7. The system of claim 1 wherein said transcript or transcripts can be exported into one or more printable and/or editable documents.

8. The system of claim 1 wherein user input can determine how similar a recurrence must be to an instance for the software system to automatically identify said recurrence as a recurrence of said instance.

9. The system of claim 1 wherein said software component that can automatically identify instances and recurrences of events in said transcript or transcripts and thereby automatically identify instances and recurrences of events in their corresponding clip or clips can be configured by user input to;
 automatically identify just instances and recurrences of events that take place between instances and/or recurrences of the words "action" and "cut";
 wherein the software system can automatically identify both instances and recurrences wherein said instances and recurrences take place between instances and/or recurrences of the words "action" and "cut".

10. The system of claim 1 wherein said in and out points can be applied automatically to said clip, clips, or a sequence of clips simultaneously as they are applied to their corresponding transcript or transcripts and;
 wherein said in and out points can be applied automatically to said transcript or transcripts simultaneously as they are applied to their corresponding clip, clips, or a sequence of clips.

11. The system of claim 1 wherein individual instances and their corresponding recurrences can be automatically grouped together separately from other instances and their corresponding recurrences;
 from which a file or files readable by audio, video, and/or audio/video editing software as audio, video, and/or audio/video sequences can be generated automatically;
 wherein said file or files can be configured by user input to contain just the content that is part of one or more specific said groups and demarcated between an in and an out point.

12. The system of claim 1 wherein individual instances and individual recurrences can be grouped freely according to user preference;
 from which a file or files readable by audio, video, and/or audio/video editing software as audio, video, and/or audio/video sequences can be generated automatically;
 wherein said file or files can be configured by user input to contain just the content that is part of one or more specific said groups and demarcated between an in and an out point.

13. The system of claim 1 wherein said in and out points can be applied manually by user input;
 wherein said manually applied in and out points can be applied to demarcate an instance;
 wherein said demarcation of said instance enables the software system to automatically identify recurrences of said demarcated instance;
 wherein said recurrences can be automatically demarcated by the software system between in and out points;
 wherein multiple sets of in and out points can be applied manually by user input;
 wherein said multiple sets of in and out points can co-exist simultaneously;
 wherein said multiple sets of in and out points can be applied by user input to individually demarcate separate instances;
 thereby enabling the software system to automatically identify recurrences of multiple instances;
 wherein said recurrences can be automatically demarcated by the software system between in and out points;
 wherein said instances can be automatically grouped with their corresponding recurrences.

14. The system of claim 1 wherein the duration of one or more demarcations created by said in and out points can be customized by user input;
 wherein said in and/or out points can be individually or collectively moved to change the overall duration of one or more demarcations and/or the exact point at which one or more in and/or out points are positioned.

15. The system of claim 1 wherein one or more individual demarcations can be selected by user input to enable user input to modify the parameters and/or settings of said one or more selected individual demarcations.

16. The system of claim 1 wherein one or more individual groups of demarcations can be selected by user input to enable user input to modify the parameters and/or settings of the individual demarcations within said one or more selected groups with simultaneity.

17. The system of claim 1 wherein another software component can automatically generate a file or files readable by audio, video, and/or audio/video editing software as subtitles/captions from said transcript or transcripts and/or portions thereof;
 wherein said file or files readable by audio, video, and/or audio/video editing software as subtitles/captions contain the text of the transcript or transcripts and/or portions thereof from which they were generated;
 wherein said file or files readable by audio, video, and/or audio/video editing software as subtitles/captions are time-synced with the clip or clips that correspond to the transcript or transcripts, or portions thereof, from which said file or files readable by audio, video, and/or audio/video editing software as subtitles/captions were generated.

18. The system of claim 1 wherein the interactive graphical user interface provides the user with four time-synced views that can display and/or playback one or more audio, video, and/or audio/video clips or a sequence of audio, video, and/or audio/video clips and any corresponding transcript, transcripts, or amalgamated transcript;
 wherein one of said views can display and/or playback the video portions of said clip or clips or sequence of clips;

wherein the second of said views can display and/or playback the audio portions of said clip or clips or sequence of clips as a waveform or waveforms;

wherein the third of said views can display and/or playback any transcript, transcripts, or amalgamated transcript that corresponds to said clip or clips or sequence of clips;

wherein the user has the ability to toggle between said three of four views;

wherein the fourth of said views is a timeline view synced to said three views;

wherein said fourth view remains visible while any of said first three views are visible;

wherein during playback of a clip, clips, or sequence of clips that contain audio content, said audio content is audible across all views.

19. The system of claim 1 wherein the interactive graphical user interface includes a find and replace tool;

wherein said find and replace tool can be applied by the user to find and/or replace specific content in a transcript or transcripts;

wherein said find and replace tool that can be applied by the user to find and/or replace specific content in a transcript or transcripts thereby enables;

said find and replace tool to be applied by the user to simultaneously search the audio and/or video content of any clip, clips, or a sequence of clips;

wherein said clip, clips, or a sequence of clips correspond to a searchable transcript or transcripts.

20. The system of claim 1 wherein another software component applies timecode data so that said transcript or transcripts can be;

automatically displayed by the software system in a mode wherein said transcript or transcripts appear arranged, amalgamated, duplicated, divided, and/or trimmed such that;

their arrangement, amalgamation, duplication, division, and/or trimming matches the arrangement, amalgamation, duplication, division, and/or trimming of their corresponding clip or clips in an audio, video, and/or audio/video sequence or a file readable by audio, video, and/or audio/video editing software as an audio, video, and/or audio/video sequence and such that;

said transcript or transcripts displayed in said mode appear as one transcript that;

functions as a transcript of the particular arrangement, amalgamation, duplication, division, and/or trimming of said corresponding clip or clips in said audio, video, and/or audio/video sequence or file readable by audio, video, and/or audio/video editing software as an audio, video, and/or audio/video sequence and that is;

time-synced with the arrangement, amalgamation, duplication, division, and/or trimming of said corresponding clip or clips in said audio, video, and/or audio/video sequence or file readable by audio, video, and/or audio/video editing software as an audio, video, and/or audio/video sequence and can be;

played back in sync and with simultaneity with said arrangement, amalgamation, duplication, division, and/or trimming of said corresponding clip or clips in said audio, video, and/or audio/video sequence or file readable by audio, video, and/or audio/video editing software as an audio, video, and/or audio/video sequence.

21. The system of claim 20 wherein said arrangement, amalgamation, duplication, division, and/or trimming of said transcript or transcripts that appear as one transcript can be exported into one or more printable and/or editable documents.

22. The system of claim 20 wherein another software component can automatically generate a file or files readable by audio, video, and/or audio/video editing software as subtitles/captions from said arrangement, amalgamation, duplication, division, and/or trimming of said transcript or transcripts that appear as one transcript;

wherein said file or files readable by audio, video, and/or audio/video editing software as subtitles/captions contain the text of said arrangement, amalgamation, duplication, division, and/or trimming of said transcript or transcripts;

wherein said file or files readable by audio, video, and/or audio/video editing software as subtitles/captions are time-synced with the arrangement, amalgamation, duplication, division, and/or trimming of said clip or clips in said audio, video, and/or audio/video sequence or file readable by audio, video, and/or audio/video editing software as an audio, video, and/or audio/video sequence that correspond to the arrangement, amalgamation, duplication, division, and/or trimming of said transcript or transcripts from which said file or files readable by audio, video, and/or audio/video editing software as subtitles/captions were generated.

23. The system of claim 1 wherein metadata can be generated by the software system that is readable by audio, video, and/or audio/video editing software as a marker or markers;

wherein said metadata can be included in said marker or markers as text;

wherein said metadata and/or marker or markers can be made part of said file or files readable by audio, video, and/or audio/video editing software as audio, video, and/or audio/video sequences;

wherein said metadata and/or marker or markers can be automatically placed at moments defined by user input and/or the in point, out point, or for the duration of a demarcation or demarcations.

24. The system of claim 23 wherein the text of said metadata and/or said marker or markers can be customized by user input to;

automatically correspond to the first few words of the transcribed utterance, utterances, or recurrence within the demarcation whereat said metadata and/or said marker or markers are placed and/or;

automatically correspond to the last few words of the transcribed utterance, utterances, or recurrence within the demarcation whereat said metadata and/or said marker or markers are placed.

25. The system of claim 23 wherein the text of said metadata and/or said marker or markers can be customized by user input to;

automatically correspond to the file name of one or more clips partially or wholly within the demarcation whereat said metadata and/or said marker or markers are placed.

26. The system of claim 23 wherein the text of said metadata and/or said marker or markers can be customized by user input to;

automatically follow a numerical system wherein;

the metadata and/or marker or markers that are placed at an instance or recurrence that occurs chronologically first, relative to its corresponding instance or recurrences, contains text that has the number "1" and wherein;

the metadata and/or marker or markers that are placed at an instance or recurrence that occurs chronologically second, relative to its corresponding instance or recurrences, contains text that has the number "2";

and so on.

27. The system of claim 23 wherein the text of said metadata and/or said marker or markers can be customized by user input to;
- include the scene and/or take number wherein;
- said scene and/or take number is extrapolated from the file name of one or more clips partially or wholly within the demarcation whereat said metadata and/or said marker or markers are placed;
- wherein said extrapolation is performed automatically by the software system;
- wherein said extrapolation occurs wherein said file name follows one or more naming conventions that indicate the scene and/or take number.

28. The system of claim 23 wherein the text of said metadata and/or said marker or markers can be customized by user input to;
- include the scene and/or take number wherein;
- optical character recognition is applied as a means of extrapolating the scene and/or take number from one or more clips partially or wholly within the demarcation whereat said metadata and/or said marker or markers are placed;
- wherein said extrapolation is performed automatically by the software system;
- wherein said optical character recognition is applied to extrapolate said scene and/or take number from the slate and/or clapperboard as it appears within the visual content of said one or more clips that are partially or wholly within the demarcation whereat said metadata and/or said marker or markers are placed;
- wherein said slate and/or clapperboard appears within said visual content;
- wherein said slate and/or clapperboard appears within or without said demarcation.

29. The system of claim 23 wherein the text of said metadata and/or said marker or markers can be customized by user input to;
- include the scene and/or take number wherein;
- pre-existing metadata is applied as a means of extrapolating the scene and/or take number;
- wherein said extrapolation is performed automatically by the software system;
- wherein said pre-existing metadata indicates the scene and/or take number of one or more clips partially or wholly within the demarcation whereat said metadata and/or said marker or markers are placed.

30. The system of claim 23 wherein the text of said metadata and/or said marker or markers can be customized by user input to;
- include custom text.

31. The system of claim 23 wherein computer vision and/or image recognition is applied to interpret the visual content of a clip, clips, or sequence of clips to;
- produce metadata that can specify and/or classify the visual content of a clip, clips, or a sequence of clips, or specific spans of time therein;
- wherein said specifications and/or classifications can take the form of keywords, tags, labels, phrases, sentences, and/or other text that can describe and/or correspond to specific spans of time of visual content within said clip, clips, or sequence of clips;
- wherein visual content interpreted may include objects, subjects, actions, behaviors, aesthetics, light, colors, motion, stillness, shot type, shot distance from subject, shot angle, emotional expression, and/or any other kind of visual content.

32. The system of claim 23 wherein sound recognition is applied to interpret the sound content of a clip, clips, or sequence of clips to;
- produce metadata that can specify and/or classify the sound content of a clip, clips, or a sequence of clips, or specific spans of time therein;
- wherein said specifications and/or classifications can take the form of keywords, tags, labels, phrases, sentences, and/or other text that can describe and/or correspond to specific spans of time of sound content within said clip, clips, or sequence of clips;
- wherein sound content interpreted may include types of sounds, types of speech, object specific sound events, subject specific sound events, clatter, actions, tones, aesthetics, situationally unique sounds, emotional expression in sound and/or speech and/or action, and/or any other kind of sound content;
- wherein pre-recorded unique tones or other sounds might be used during shooting/recording to help the software system automatically identify specific spans of time within a clip, clips, or sequence of clips to improve and/or expedite demarcation;
- wherein the software system can be directed by user input to recognize a specific tone or other sound as an indication to create a demarcation in point;
- wherein the software system can be directed by user input to recognize a specific tone or other sound as an indication to create a demarcation out point.

33. The system of claim 23 wherein said metadata generated by the software system can enable;
- user input to search, navigate, and/or select specific metadata;
- wherein said metadata can be customized and/or added to by user input;
- wherein said metadata corresponds to specific clips;
- wherein said metadata can be set to correspond to specific clips automatically by the software system;
- wherein said search, navigation, and/or selection of specific metadata thereby enables;
- the software system to automatically present the user with just the clips that correspond to said search, navigation, and/or selection of specific metadata;
- from which a file or files readable by audio, video, and/or audio/video editing software as audio, video, and/or audio/video sequences can be generated automatically;
- wherein said file or files can be configured by user input to contain just the clip or clips that correspond to said search, navigation, and/or selection of specific metadata;
- wherein said metadata can take the form of keywords, tags, labels, phrases, sentences, and/or other text.

34. The system of claim 33 wherein said metadata can correspond to specific spans of time in a clip or clips;
- wherein said metadata can be set to correspond to specific spans of time in a clip or clips automatically by the software system;
- wherein said metadata can be customized and/or added to by user input;
- wherein said specific spans of time correspond to a specific timecode or timecodes;
- thereby enabling the software system to automatically present the user with just the spans of time within a clip or clips that correspond to said search, navigation, and/or selection of specific metadata;

from which a file or files readable by audio, video, and/or audio/video editing software as audio, video, and/or audio/video sequences can be generated automatically;

wherein said file or files can be configured by user input to contain just the spans of time within a clip or clips that correspond to said search, navigation, and/or selection of specific metadata;

wherein said metadata can take the form of keywords, tags, labels, phrases, sentences, and/or other text.

35. The system of claim 1 wherein margins can be automatically generated and applied to a demarcation by the software system;

wherein there is an in margin that is distinct from an out margin;

wherein said in margin is positioned right after a demarcation's in point;

wherein said out margin is positioned right before a demarcation's out point.

36. The system of claim 35 and;

wherein a demarcation is the demarcation of an instance, said demarcation's in margin has a duration that can be defined by the amount of time between said demarcation's in point, and the beginning of the first transcribed utterance to appear within said demarcation;

wherein a demarcation is the demarcation of an instance, said demarcation's out margin has a duration that can be defined by the amount of time between the end of the last transcribed utterance to appear within said demarcation and said demarcation's out point;

wherein a demarcation is the demarcation of a recurrence, said demarcation's in margin has a duration that can be defined by the duration of the in margin of said demarcation's corresponding instance demarcation;

wherein a demarcation is the demarcation of a recurrence, said demarcation's out margin has a duration that can be defined by the duration of the out margin of said demarcation's corresponding instance demarcation;

wherein a demarcation is the demarcation of an instance, said demarcation's in margin is automatically applied in such a way that said in margin ends just as the first transcribed utterance to appear within said demarcation begins;

wherein a demarcation is the demarcation of an instance, said demarcation's out margin is automatically applied in such a way that said out margin begins just as the last transcribed utterance to appear within said demarcation ends;

wherein a demarcation is the demarcation of a recurrence, said demarcation's in margin is automatically applied in such a way that said in margin ends just as the recurrence within said demarcation begins;

wherein a demarcation is the demarcation of a recurrence, said demarcation's out margin is automatically applied in such a way that said out margin begins just as the recurrence within said demarcation ends.

37. The system of claim 35 wherein the duration of said margins can be customized by user input.

38. The system of claim 35 wherein said margins can be offset from their initial position by user input;

wherein said offsetting that is applied to an in margin automatically applies the same offsetting to said in margin's corresponding in point and;

wherein said offsetting that is applied to an out margin automatically applies the same offsetting to said out margin's corresponding out point such that;

said in and out points maintain their positions relative to their corresponding margins.

39. The system of claim 35 wherein in margins can be anchored to instances and/or recurrences of the word "action" and out margins can be anchored to instances and/or recurrences of the word "cut" such that;

in margins begin just as a transcribed utterance of "action" ends and such that out margins end just as a transcribed utterance of "cut" begins.

40. The system of claim 1 wherein a script or screenplay can be loaded into the software system by the user.

41. The system of claim 40 wherein loading a script or screenplay into the software system enables improved transcript accuracy.

42. The system of claim 40 wherein loading a script or screenplay into the software system enables speaker designation to transcripts;

wherein speaker designations can be automatically derived from said script or screenplay.

43. The system of claim 40 wherein loading a script or screenplay into the software system enables a software component wherein;

said script or screenplay can be displayed by the interactive graphical user interface;

wherein said script or screenplay can be navigated by the user;

wherein sections of said script or screenplay can be demarcated between an in and an out point by the user;

wherein performing said demarcation enables the software system to;

automatically identify instances and recurrences of events within any transcript or transcripts that correspond to or are the same or similar to the section or sections of said script or screenplay that are demarcated between an in and an out point, thereby enabling the software system to;

automatically identify instances and recurrences of events within any audio and/or audio/video clips that correspond to said transcript or transcripts that correspond to or are the same or similar to the section or sections of said script or screenplay that are demarcated between an in and an out point;

wherein said identification of said instances and/or recurrences of events within said audio and/or audio/video clips can be used to enable the software system to;

automatically generate a file or files readable by audio, video, and/or audio/video editing software as audio, video, and/or audio/video sequences;

wherein said file or files can be configured by user input to contain just said instances and recurrences of events within any audio and/or audio/video clips that correspond to said instances and recurrences of events within said transcript or transcripts that correspond to or are the same or similar to the section or sections of said script or screenplay that are demarcated between an in and an out point.

44. The system of claim 43 wherein user input can define how similar said instances and/or recurrences must be to sections of said script or screenplay demarcated between an in and an out point for the software system to automatically identify said instances and/or recurrences as corresponding to said section or sections.

45. The system of claim 43 wherein more than one set of in and out points can co-exist simultaneously across said script or screenplay.

46. The system of claim 43 wherein said instances and recurrences of events within any audio and/or audio/video clips that correspond to said instances and recurrences of events within said transcript or transcripts that correspond to or are the same or similar to a specific section of said script or screenplay demarcated between an in and an out point can be automatically grouped together separately from other instances and recurrences of events within any audio and/or audio/video clips that correspond to other instances and recurrences of events within said transcript or transcripts that correspond to or are the same or similar to other sections of said script or screenplay demarcated between an in and an out point;

from which a file or files readable by audio, video, and/or audio/video editing software as audio, video, and/or audio/video sequences can be generated automatically;

wherein said file or files can be configured by user input to contain just the content that is part of one or more specific said groups.

47. The system of claim 43 wherein optical character recognition is applied as a means of automatically extrapolating the scene and/or take number of a clip or clips;

wherein said optical character recognition is applied to extrapolate said scene and/or take number from the slate and/or clapperboard;

wherein said slate and/or clapperboard appears in the visual content of one or more clips;

wherein said extrapolation is applied as a means of automatically identifying instances and recurrences of events within any video, and/or audio/video clips that correspond to or are the same or similar to a section or sections of said script or screenplay;

wherein said script or screenplay contains scene numbers.

48. The system of claim 43 wherein scene and/or take numbers are extrapolated from the file name of one or more clips;

wherein said extrapolation is performed automatically by the software system;

wherein said extrapolation occurs wherein said file name follows one or more naming conventions that indicate the scene and/or take number;

wherein said extrapolation is applied as a means of automatically identifying instances and recurrences of events within any audio and/or audio/video clips that correspond to or are the same or similar to a section or sections of said script or screenplay;

wherein said script or screenplay contains scene numbers.

* * * * *